US008305972B2

(12) United States Patent
Baker et al.

(10) Patent No.: US 8,305,972 B2
(45) Date of Patent: Nov. 6, 2012

(54) PROACTIVE SCHEDULING METHODS AND APPARATUS TO ENABLE PEER-TO-PEER COMMUNICATION LINKS IN A WIRELESS OFDMA SYSTEM

(75) Inventors: Michael H. Baker, Elmhurst, IL (US); Jeffrey D. Bonta, Arlington Heights, IL (US); George Calcev, Hoffman Estates, IL (US); Nitin R. Mangalvedhe, Hoffman Estates, IL (US); James P. Michels, Lake Zurich, IL (US); Nathan J. Smith, Urbana, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 688 days.

(21) Appl. No.: 12/360,428

(22) Filed: Jan. 27, 2009

(65) Prior Publication Data

US 2010/0189048 A1  Jul. 29, 2010

(51) Int. Cl.
*H04W 4/00* (2009.01)
(52) U.S. Cl. ............... 370/329; 370/252; 455/452.2; 455/513
(58) Field of Classification Search .............. None
See application file for complete search history.

(56) References Cited

U.S. PATENT DOCUMENTS

| 5,535,240 | A | 7/1996 | Carney et al. |
| 5,758,090 | A | 5/1998 | Doner |
| 5,848,097 | A | 12/1998 | Carney et al. |
| 6,339,694 | B1 | 1/2002 | Komara et al. |
| 2005/0281221 | A1 | 12/2005 | Roh et al. |
| 2006/0126749 | A1 | 6/2006 | Armour et al. |
| 2007/0019668 | A1 | 1/2007 | Lee et al. |
| 2007/0081491 | A1 | 4/2007 | Kim et al. |
| 2007/0104087 | A1 | 5/2007 | Tee et al. |
| 2007/0104129 | A1 | 5/2007 | Yang et al. |
| 2007/0115880 | A1 | 5/2007 | Huh et al. |
| 2007/0121547 | A1 | 5/2007 | Huh et al. |

(Continued)

FOREIGN PATENT DOCUMENTS

KR   1020060048938 A   5/2006

(Continued)

OTHER PUBLICATIONS

Christoph Rapp, "Effects of HPA-Nonlinearlity on a 4-DPSK/OFDM-Signal for a Digital Sound Broadcasting System," 2nd European Conference on Satellite Communications, Oct. 22-24, 1991, pp. 179-184.

(Continued)

*Primary Examiner* — Chi Pham
*Assistant Examiner* — Mohammad Adhami
(74) *Attorney, Agent, or Firm* — Randi L. Karpinia; Steven A. May

(57) ABSTRACT

Systems, methods and apparatus are provided for scheduling resources in Orthogonal Frequency-Division Multiple Access (OFDMA) communication networks for "direct link" or peer-to-peer communications among stations operating therein so that OFDMA resources can be allocated to a transmitter station for a peer-to-peer communication session with a receiver station such that near-far issues caused by peer-to-peer communication are reduced/avoided. The disclosed technologies can prevent peer-to-peer communication links using different sub-channels within the same time slot from creating near-far issues for other receiver stations that are within communication range.

23 Claims, 16 Drawing Sheets

U.S. PATENT DOCUMENTS

| | | | |
|---|---|---|---|
| 2007/0121666 A1 | 5/2007 | Kim et al. | |
| 2007/0155337 A1 | 7/2007 | Park et al. | |
| 2007/0173198 A1 | 7/2007 | Kim et al. | |
| 2007/0201398 A1 | 8/2007 | Yang et al. | |
| 2007/0201400 A1 | 8/2007 | Kang et al. | |
| 2008/0240267 A1 | 10/2008 | Hassan et al. | |
| 2008/0274729 A1 | 11/2008 | Kim et al. | |
| 2009/0011768 A1* | 1/2009 | Seok et al. | 455/450 |
| 2009/0092055 A1 | 4/2009 | Balasubramanian et al. | |
| 2009/0175178 A1* | 7/2009 | Yoon et al. | 370/252 |
| 2009/0303939 A1* | 12/2009 | Umesh et al. | 370/329 |
| 2010/0169498 A1* | 7/2010 | Palanki et al. | 709/228 |
| 2010/0202313 A1 | 8/2010 | Barratt et al. | |
| 2010/0260132 A1* | 10/2010 | Rao | 370/329 |
| 2012/0093098 A1* | 4/2012 | Charbit et al. | 370/329 |
| 2012/0106517 A1* | 5/2012 | Charbit et al. | 370/336 |

FOREIGN PATENT DOCUMENTS

WO    WO/2006/135019    * 12/2006

OTHER PUBLICATIONS

U.S. Patent Unpublished U.S. Appl. No. 12/360,220, filed Jan. 27, 2009.

C. Ciochina, F. Buda, H. Sari, An Analysis of OFDM Peak Power Reduction Techniques for WiMAX systems, IEEE ICC 2006 Proceedings, pp. 4676-4681.

Draft Standard for IEEE 802.11n D2.00, Part 11: Wireless LAN Medium Access Control (MAC) and Physical Layer (PHY) specifications, Feb. 2007, p. 294.

ETSI EN 301 389-1, Apr. 2008.

FCC CFR47 [B8], Section 15, Jul. 2008.

H.J. Kim, S.C. Cho, H.S Oh, J.M. Ahn, "Adaptive clipping technique for reducing PAPR on OFDM systems", IEEE VTC-2003 Fall. 2003 IEEE 58th, vol. 3, Oct. 6-9, 2003, pp. 1478-1481 vol. 3.

IST-2003-507581 Winner D2.2 V.1.0, "Feasibility of Multi-Bandwidth Transmissions", Oct. 2004.

IST-2003-507581 Winner D7.7 V.1.0, " Winner System Concept Complexity Estimates", Month 24, p. 31.

IEEE Standard for Local Metropolitan area networks, Part 16: Air Interface for Fixed Broadband Wireless Access Systems, p. 631, Oct. 2004.

Office Action mailed Dec. 5, 2011 in U.S. Appl. No. 12/360,220, Michael H. Baker, filed on Jan. 27, 2009.

International Search Report and Written opinion for International Application No. PCT/US2010/021778 mailed on Aug. 5, 2010.

International Preliminary Report on Patentability & Written Opinion for International Application No. PCT/US2010/021778 mailed on Aug. 2, 2011.

International Search Report and Written opinion for International Application No. PCT/US2010/021801 mailed on Aug. 6, 2010.

International Preliminary Report on Patentability & Written Opinion for International Application No. PCT/US2010/021801 mailed on Aug. 2, 2011.

Non Final Office Action mailed on Mar. 16, 2012 in related U.S. Appl. No. 12/360,220, filed on Jan. 27, 2009.

* cited by examiner

| 510 | 520 | 530 | 540 | 550 | 560 | 570 |
|---|---|---|---|---|---|---|
| IE ID # | IE SIZE | TIME SLOT START | # TIME SLOTS | RESOURCE TYPE | MAXIMUM # REPORTS | RSS POWER CATEGORIES |

(530 brace spans TIME SLOT START through RSS POWER CATEGORIES)

| 610 | 620 | 630 | 640 |
|---|---|---|---|
| IE ID # | IE SIZE | MEASUREMENT TYPE | MEASUREMENT QUALITY |

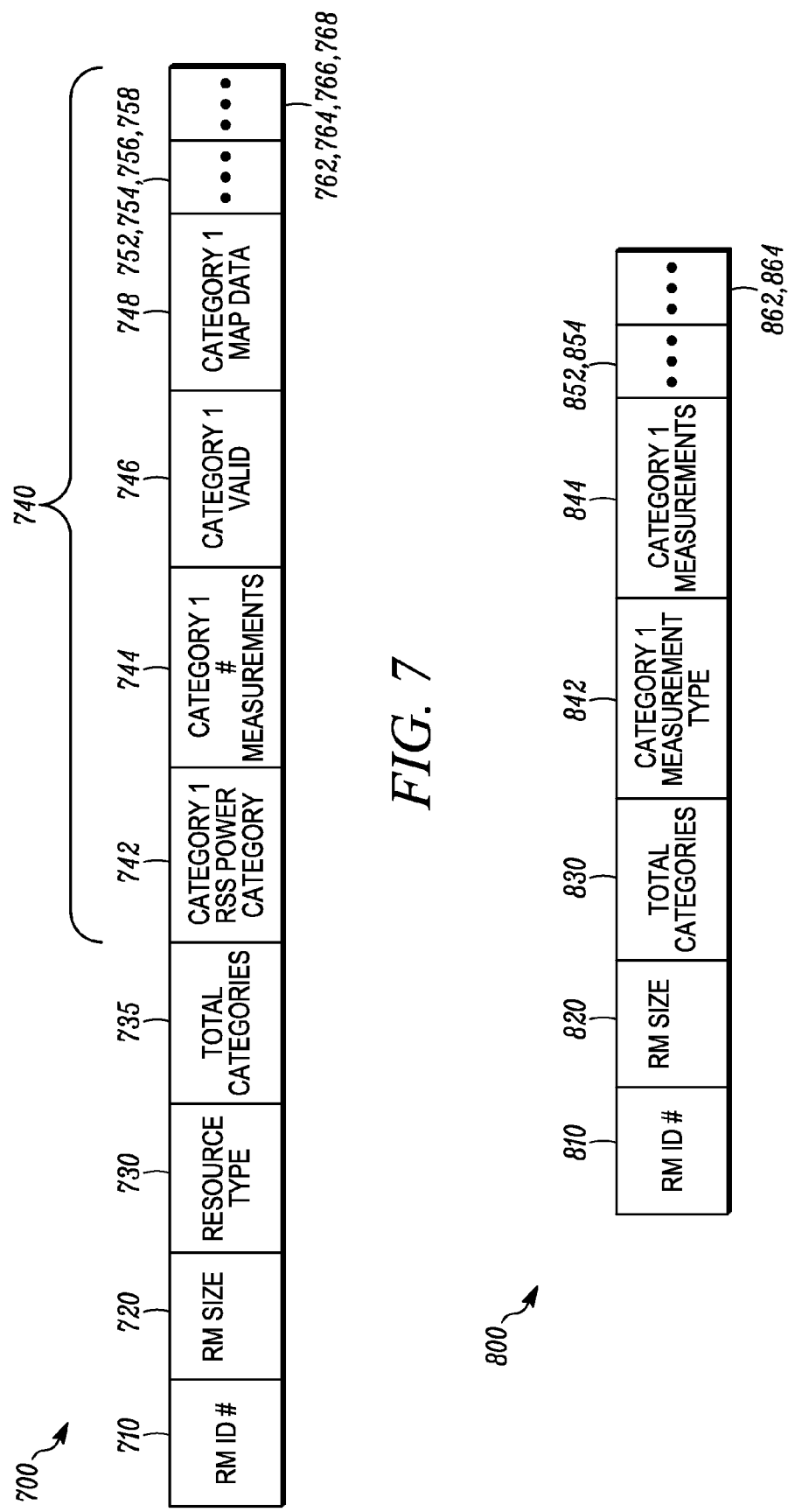

US 8,305,972 B2

PROACTIVE SCHEDULING METHODS AND APPARATUS TO ENABLE PEER-TO-PEER COMMUNICATION LINKS IN A WIRELESS OFDMA SYSTEM

RELATED APPLICATIONS

The present application is related to the following U.S. application commonly owned with this application by Motorola, Inc.: Ser. No. 12/360,220, filed Jan. 27, 2009 concurrently with the present application, titled "Reactive Scheduling Methods and Apparatus to Enable Peer-to-Peer Communication Links in a Wireless OFDMA System", the entire contents of which being incorporated herein by reference.

FIELD OF THE DISCLOSURE

The present disclosure relates generally to wireless communications and more particularly to methods and apparatus for scheduling resources in Orthogonal Frequency-Division Multiple Access (OFDMA) communication networks for peer-to-peer communications among stations operating therein.

BACKGROUND

Orthogonal Frequency-Division Multiple Access (OFDMA) is a multiple access method for sharing a radio frequency (RF) channel among multiple users. OFDMA uses an orthogonal frequency-division multiplexing (OFDM) digital modulation scheme to modulate information signals. OFDMA can be described as a combination of frequency domain and time domain multiple access. In OFDMA, a communication space is divided into a plurality of time slots, and each time slot is further divided into a number of frequency sub-channels each having at least one of its own sub-carriers. In OFDMA systems, both time and/or frequency resources are used to separate multiple user signals. Transmissions to/from multiple users are separated using time slots and sub-channels within each time slot such that users' signals can be separated in the time domain and/or in the frequency domain. Thus, in OFDMA, resources can be partitioned in the time-frequency space.

Recently, broadband wireless networks have been developed that implement OFDMA. For instance, IEEE 802.16 networks are one example. As used herein, "IEEE 802.16" refers to a set of IEEE Wireless LAN (WLAN) standards that govern broadband wireless access methods. IEEE 802.16 standards have been and are currently being developed by working group 16 of the IEEE local area network/metropolitan area network (LAN/MAN) Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA. The Institute of Electrical and Electronics Engineers (IEEE) 802.16 *Working Group on Broadband Wireless Access Standards* is a unit of the IEEE 802 LAN/MAN Standards Committee that aims to prepare formal specifications to support the development and deployment of broadband Wireless Metropolitan Area Networks. In such 802.16 communication networks, communications signals between a base station and a station are modulated using OFDM. In one configuration, the OFDMA channel is split into a number of time slots. Each time slot is further divided into a number of frequency sub-channels (e.g., one 70 MHz wide time slot can be divided into fourteen sub-channels each being five MHz wide).

Near-Far Problem

In a wireless communication system, the near-far problem refers to the situation where a receiver receives a low-power signal from a transmitter and a high-power signal from a different transmitter at the same time, resulting in desensitization or "desense" of the receiver to the low-power signal. In other words, the high-power signal may cause the low-power signal to fall below the receiver's detectability threshold. For instance, when a high power transmitter is located near a receiver operating in the same time slot but on a different frequency sub-channel, the high transmit energy can desensitize the receiver.

Scheduling

Scheduling algorithms are widely used in wireless networks for allocating or distributing communication resources (e.g., time slots and/or sub-channels) among stations to take advantage of instantaneous channel variations by giving priority to the stations with favorable channel conditions. For instance, in an OFDMA communication system, the base station can include a time-division multiple access (TDMA) scheduler that schedules time/frequency resources used by each normal uplink communication and each downlink communication. A normal uplink communication is when a station transmits to a base station and downlink communication when the base station transmits to a station. A scheduler may assign an uplink communication on different sub-channels within the same time slot to different stations. In particular, the base station scheduler may schedule these uplink communications either in different time slots or in the same time slot and uses power control to prevent/reduce near-far interference among various stations communicating to the base station in the system. The TDMA scheduler avoids near-far problems by creating time-orthogonal uplink and downlink transmissions, and through uplink power control. For example, in OFDMA solutions which have a base station centric deployment, such as IEEE 802.16, the near-far problem is reduced by forcing each base station to create either time (TDD) or frequency (FDD) orthogonal uplinks and downlinks to prevent desensitization of the mobile receiver. Power control of uplink transmissions from a mobile station can be used to assure that signals arrive at the base station receiver at similar power levels thereby preventing desensitization of the base station's receiver.

Thus, in networks such as these, in which stations communicate directly with a base station using orthogonal frequency-division multiple access (OFDMA) for the uplink, such TDMA scheduling techniques can be used to separate low-power and high-power users in time to avoid near-far problems. However, as will be described below, such TDMA scheduling techniques will not work in all types of OFDMA networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 illustrates a resource map information element (RMIE) that is generated and broadcast by a base station (BS) in accordance with some embodiments;

FIG. 6 illustrates a grant metric information element (GMIE) that is generated and broadcast by a base station (BS) in accordance with some embodiments;

FIG. 7 illustrates a resource map response message (RMRM) that is generated and unicast by a station in accordance with some embodiments;

FIG. 8 illustrates a grant metric response message (GMRM) that is generated and unicast by a destination/receiver station (B) in accordance with some embodiments;

Figure 1:
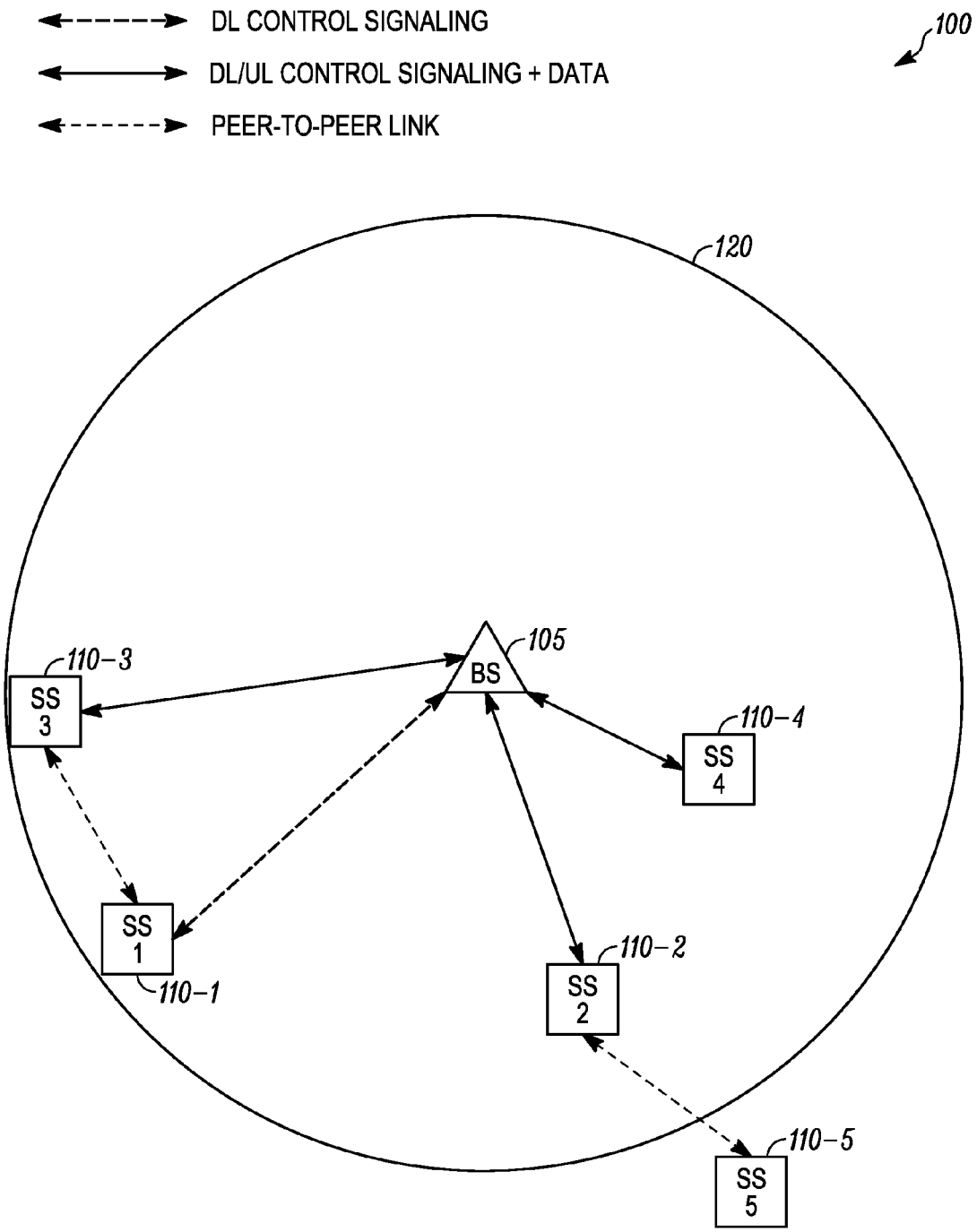
FIG. 1 illustrates an example of a wireless communication network for use in one implementation of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although the TDMA scheduling techniques described above, work well in situations where all stations communicate with and are assigned or scheduled resources by a central base station, these techniques do not work in mixed networks that also include direct station-to-station or "peer-to-peer" communication between stations. With peer-to-peer communication, there is no concept of uplink and downlink since communications between the stations are direct and do not implicate a base station. OFDMA communication systems allowing peer-to-peer and mesh ad-hoc traffic will experience significant near-far issues if conventional TDMA uplink/downlink scheduling is used. As such, with OFDMA communication systems such as these, it would be desirable to add capability for scheduled peer-to-peer and mesh hopping communication links. Accordingly, it would be desirable to provide new schedulers and scheduling techniques for use in future OFDMA systems that allow for peer-to-peer communication.

In one embodiment, systems, methods and apparatus are provided for scheduling OFDMA resources allocated to a transmitter station for a peer-to-peer communication session with a receiver station. The disclosed systems, methods and apparatus can be implemented in an OFDMA communication system such as a wide area wireless OFDMA communication network. In such systems and networks, a base station defines a cell in which a particular wideband frequency channel is divided into multiple OFDMA time slots or subframes and in which information that is transmitted is OFDM modulated. Particular examples of such systems and networks include a WiMAX IEEE 802.16 compliant network or a 3GPP Long Term Evolution (LTE) compliant network.

The base station maintains a resource allocation map. The resource allocation map includes particular OFDMA resources of an OFDMA frame that have been allocated to particular stations that are identified by particular station identification numbers. Each of the OFDMA resources is a OFDMA frequency sub-channel within an OFDMA time slot. In accordance with the disclosed systems, methods and apparatus, the base station can generate a resource map information element (RMIE) that include a Partial Resource Allocation Map (PRAM). The PRAM specifies selected OFDMA resources (of the OFDMA frame) that the base station is requesting more information about. The PRAM also include an indicator that a first metric (e.g., one or more Radio Frequency (RF) quality metrics such as Receive Signal Strength (RSS) power levels, Range, Signal-to-Noise Ratio (SNR), Signal-to-interference-plus-Noise Ratio (SINR)) is to be measured with respect to the selected OFDMA resources. The PRAM also specifies a number of first metric measurements being requested with respect to the selected OFDMA resources, and a first metric categories field which identifies one or more first metric categories a station is to report with respect to the selected OFDMA resources. The base station broadcasts the the RMIE to recipient stations including a transmitter station so that the base station can request first metric measurement information from the recipient stations based on information it has specified in the PRAM.

Upon receiving the RMIE, the recipient stations including the transmitter station, can measure first metric with respect to at least some of the selected OFDMA resources specified in the PRAM, and then each of the recipient stations can generate and transmit a resource map response message (RMRM) to the base station. Each RMRM includes information regarding first metric measurements made with respect to some of the selected OFDMA resources that the particular station has measured. Each of the recipient stations can generate a RMRM by sorting measured first metric for each of the particular ones of the selected OFDMA resources into one of a plurality of first metric categories. These first metric categories categorize the particular ones of the selected OFDMA resources based on measured first metric, and can include, for example, a high first metric category that includes information regarding peer stations that cause high level interference (e.g., peer stations having higher measured RSS levels or lower measured SINR levels), and a low first metric category that cause low level interference (e.g., peer stations having lower measured RSS levels or high measured SINR levels). Using this information, a partial resource measurement map (PRMM) is generated that includes the plurality of first metric categories. Each of the first metric categories includes first metric measurement information regarding some of the particular ones of the selected OFDMA resources. The PRMM generated by each station is included as part of the RMRM for generated by that particular station. In the description that follow, the RMRMs and PRMMs generated by the transmitter station will be referred to as first RMRMs and first PRMMs to differentiate it from RMRMs and PRMMs generated by other recipient stations.

In one implementation, each RMRM includes a resource type field that specifies a type of resource that the particular station is reporting in the RMRM, a total categories field that specifies a total number of different first metric categories being reported in the RMRM, and a partial resource measurement map (PRMM) comprising: a plurality of first metric categories each including information regarding first metric measurements made by the particular station for selected ones of the selected OFDMA resources specified in the PRAM. The plurality of first metric categories can include a high first metric category used to report high power first metric measurements, a medium first metric category used to report medium power first metric measurements, and a low first metric category used to report low power first metric measurements. In addition, each of the first metric categories comprise a plurality of fields used to report information regarding first metric measurements by the particular station for that first metric category The plurality of fields can include a category identifier field that identifies the particular first metric category, a number measured field that specifies a number of first metric measurements that are included for the particular first metric category, and a category MAP data field that specifies particular resource locations in the resource allocation map for the particular first metric category. Again, each particular resource location is specified as at least one specific sub-channel and at least one time slot.

The transmitter station also generates and transmits a resource request message (RRM) to request allocation of some of the OFDMA resources for the peer-to-peer communication session with the receiver station. The resource request message (RRM) can include, for example, information regarding the station type of the transmitter station, information regarding the size of the packet to be transmitted by the transmitter station, and an indicator which indicates the type of peer-to-peer communication session the transmitter station would like to set up with the receiver station including information regarding QoS requirements for that type of peer-to-peer communication session.

Upon receiving the first RMRM and the RRM from the transmitter station, the base station can process the RMRMs to determine specific ones of the OFDMA resources to be allocated to the transmitter station for the peer-to-peer communication session with the receiver station. The specific ones of the OFDMA resources allocated to the transmitter station each comprise: an allocated OFDMA sub-channel within a particular OFDMA time slot. The specific ones of the OFDMA resources are allocated such that other stations communicating over different OFDMA sub-channels of the particular OFDMA time slots will not cause near-far problems for the receiver station, and such that communications by the transmitter station using the specific ones of the OFDMA resources will not cause near-far problems for the other receiver stations communicating over different OFDMA sub-channels of the particular OFDMA time slots.

For example, the base station can determine updated peer station information for the transmitter station based on the one or more first PRMMs from the first RMRM, and use this peer information to schedule a first OFDMA resource in a first OFDMA time slot for a first transmission by the transmitter station to the receiver station, and to schedule other OFDMA resources in other OFDMA time slots for other transmissions by high first metric peer stations of the receiver station (i.e., station having high power first metric). This way, the first transmission will be received by the receiver station at a time when the high first metric peer stations of the receiver station are not transmitting. Accordingly, the first transmission is isolated in the time domain from the other transmissions by the high first metric peer stations of the receiver station.

To explain further, in accordance with one exemplary embodiment, the base station can determine updated peer station information for the transmitter station by extracting information regarding first metric measurements made by the transmitter station for the selected ones of the selected OFDMA resources from the first PRMMs. The base station can then use the resource allocation map maintained at the base station to translate the selected ones of the selected OFDMA resources into corresponding peer station identification numbers. The base station can then determine first metric categories from the one or more first PRMMs for each of the peer station identification numbers, and assign each particular peer station identification number to one of: a high power first metric transmitter peer list that specifies peer stations having high power first metric, a low power first metric transmitter peer list that specifies peer stations having low power first metric, and a medium power first metric transmitter peer list that specifies peer stations having medium power first metric. Using this information, the base station can create an entry in a peer memory map (PMM) for the transmitter station. The PMM comprises a plurality of rows, and a plurality of columns. The plurality of columns can include a first column that lists peer station identification numbers corresponding to peer-to-peer enabled stations that can potentially engage in peer-to-peer communications including the transmitter station and the receiver station. Each row corresponds to entry for a particular peer-to-peer enabled station that is identified in the first column by a particular peer station identification number. The plurality of columns can also include a second column comprising the high power first metric transmitter peer list that specifies peer stations having high power first metric. The second column lists peer station identification numbers for peer stations of the corresponding station in the first column. The plurality of columns can also include a third column comprising the low power first metric transmitter peer list that specifies peer stations having low power first metric. The third column lists peer station identification numbers for peer stations of the corresponding station in the first column. The plurality of columns can also include a fourth column comprising the medium power first metric transmitter peer list that specifies peer stations having medium power first metric. The fourth column lists peer station identification numbers for peer stations of the corresponding station in the first column.

The base station can then process the first PRMM provided in the first RMRM and other PRMMs provided in other RMRMs from other recipient stations to generate a "high impact peer set" and a "low impact peer set." The high impact peer set identifies stations in the high power first metric transmitter peer list of the transmitter station that are susceptible to near-far issues when one station that belongs to the high impact peer set transmits while another station that belongs to the high impact peer set is receiving a different transmission from another station that does not belong to the high impact peer set. By contrast, the low impact peer set that identifies stations in the low power first metric transmitter peer list of the transmitter station that are not susceptible to near-far issues when one station that belongs to the low impact peer set transmits while another station that belongs to the low impact peer set is receiving a different transmission from another station that does not belong to the low impact peer set. The base station can then use the information in the resource allocation map, the high impact peer set and the low impact peer set to determine preferred OFDMA time slots ($TS_p$) of the OFDMA frame and excluded OFDMA time slots ($TS_x$) of the OFDMA frame, and can mark the preferred OFDMA time slots ($TS_p$) and excluded OFDMA time slots ($TS_x$) in the resource allocation map that it maintains. In one implementation, the base station can mark any time slots allocated to peer stations in a high impact peer set of the receiver station as excluded OFDMA time slots ($TS_x$), and can mark any time slots allocated to peer stations in the high impact peer set of the transmitter station as preferred OFDMA time slots ($TS_p$). When the high impact peer set of the transmitter station includes no peer stations, the base station can mark any time slots allocated to peer stations in a low impact peer set of the receiver station as preferred OFDMA time slots ($TS_p$). When an OFDMA time slot is marked as being both an excluded time slot ($TS_x$) and preferred time slot ($TS_p$), the base station can mark the OFDMA time slot: as a preferred OFDMA time slot ($TS_p$) when the transmitter station is a member of the high impact peer set of the receiver station, or as an excluded OFDMA time slot ($TS_x$) of the OFDMA frame when the transmitter station is not a member of the high impact peer set of the receiver station.

The base station can then estimate a resource allocation size (RAS) for the peer-to-peer communication session between the transmitter station and the receiver station. The base station can determine based on the estimated RAS, a resource allocation to allocate for the peer-to-peer communication session between the transmitter station and the receiver station. This resource allocation includes at least one of the preferred OFDMA time slots ($TS_p$) and at least one sub-channel in that preferred OFDMA time slot ($TS_p$). However, in general, the "resource allocation" can be any combination of one or more preferred time slots ($TS_p$) and any combination of one or more subcarriers/sub-channels within the one or more preferred time slots ($TS_p$). The base station can then transmit a resource grant message (RGM) to notify the transmitter station and the receiver station of the resource allocation to the transmitter station and the receiver station for the peer-to-peer communication session between them.

As the peer-to-peer communication session between the transmitter station and the receiver station takes place the resource measurement information specified in the RMIE can be dynamically adjusted as traffic characteristics change within the OFDMA cell defined by the base station.

Embodiments of the present invention can apply to a number of network configurations. Prior to describing some embodiments, one example of a network configuration in which these embodiments can be applied will now be described with reference to FIG. 1.

Embodiments of the present invention can apply to a number of network configurations. Prior to describing some embodiments, one example of a network configuration in which these embodiments can be applied will now be described with reference to FIG. 1.

FIG. 1 illustrates a wireless communication network 100 for use in an implementation of the present invention. The network 100 is capable of operating in compliance with the IEEE 802.16 standards. As illustrated, the network 100 includes a plurality of subscriber stations 110-$n$ and at least one base station 105. As used herein, the term "uplink (UL)" refers to a communication link for carrying information from a station to a base station (or alternatively clusterhead station or access point), and can also refer to a transmission from a station to a base station. As used herein, the term "downlink (DL)" refers a communication link that carries information from a base station (or alternatively clusterhead station or access point) to a station and can also refer to a transmission from a base station to a station. In the embodiments described herein, both the UL and DL are transmitted using OFDMA techniques that will be described in greater detail below.

The stations 110 are wireless communication devices enabled to communicate "peer-to-peer" or directly with another station, and to communicate with the base station 105 over OFDMA communication links. A station is potentially mobile (i.e., not fixed) and can be mobile at any particular time, whereas the base station 105 is fixed at a particular location.

The base station 105 can communicate data and/or control signaling information with plurality of stations 110-$n$. In FIG. 1, the single-ended, dotted line arrows represent a downlink that carries control or signaling information transmitted from the base station 105, and the double-ended, solid line arrows represent an uplink that carries data and/or control information transmitted from a station to the base station 105 and a downlink that carries data information and/or control or signaling information transmitted from the base station 105 to a station. The double-ended, dotted-line arrows represent a peer-to-peer communication link that carries information from a station to another station. In network 100, stations SS1 110-1 and SS5 110-5 have direct peer-to-peer communication links with stations 110-3 and 110-2, respectively.

To provide greater control over the network many decisions are made at the base station 105. For example, centralized scheduling algorithms can be implemented within the base station 105, and the base station 105 can be responsible for making resource scheduling decisions for allocating resources to the various stations (SSs) 110-$n$ operating within the cell that is defined by the base station (e.g., in the base station's "cell"). As will be described below, the base station 105 is responsible for making scheduling decisions. As noted above, in an OFDMA system, the uplink and downlink radio frequency resources are divided into multiple slots in the time domain, and into a number of subcarriers in the frequency domain. Within one time slot, different subcarriers can be allocated to different users in any order. Moreover, the subcarriers assigned to a particular user can vary from time slot to time slot (e.g., a diversity subcarrier sub-channelization scheme where subcarriers assignments do not need to follow the precise pattern in each time slot). As used herein, the term "resource" refers to a time slot within an OFDMA frame 400 and a frequency subcarrier/sub-channel within that time slot. In some systems, two or more resources are grouped together in a "tile" that includes more than one resource (e.g., one time slot with two or more subcarriers/sub-channels in that time slot grouped together or two or more time slots and one or more subcarriers/sub-channels in each time slot grouped together). The term "resource allocation" refers to resources allocated (or granted) to a particular source/transmitter station by a base station for communications between the source/transmitter station and a destination/receiver station. A resource allocation may comprise any combination of (1) time slots and (2) any combination of subcarriers/sub-channels within those time slots that are allocated by a base station to a transmitting/source station. The minimum resource allocation is one time slot and one subcarrier/sub-channel within that time slot. In some implementations, resources are allocated in a rectangular aggregation of contiguous frequency sub-channels and time slots.

In accordance with the various embodiments described herein, the base station 105 schedules uplink resources and downlink resources for communication with various stations 110-$n$. In addition, as will be described below, the base station 105 also schedules resources for direct, peer-to-peer communication links that are used to communicate between stations. Prior to describing the scheduling methods in detail below, one example of a base station 205 and one example of a station 310 will now be described with reference to FIGS. 2 and 3, respectively.

Figure 2:
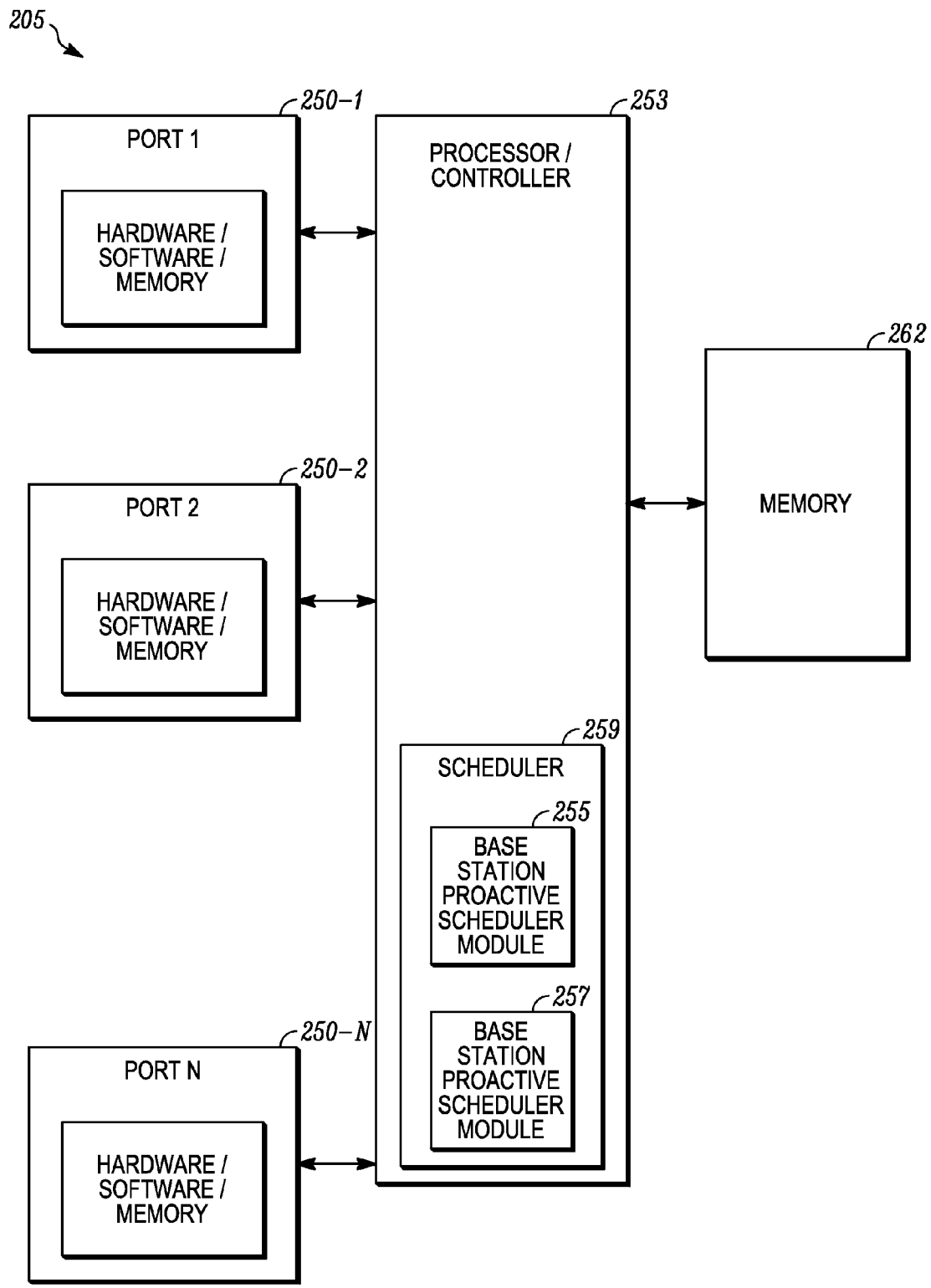
FIG. 2 illustrates an example of a base station (BS) in accordance with some embodiments of the present invention.

FIG. 2 illustrates an example of a base station 205 in accordance with some embodiments of the present invention. As illustrated, the base station 205 comprises a plurality of ports 250-$n$, a controller 253, and a memory 262.

Each port 250-$n$ provides an endpoint or "channel" for network communications by the base station 205. Each port 250-$n$ may be designated for use as, for example, an IEEE 802.16 port or a backhaul port. For example, the base station 205 can communicate with one or more stations within an 802.16 network using an IEEE 802.16 port. An IEEE 802.16 port, for example, can be used to transmit and receive both data and control, signaling or management information. A backhaul port similarly can provide an endpoint or channel for backhaul communications by the base station 205. For example, the base station 205 can communicate with a wired backhaul via the backhaul port; the backhaul port does not need to communicate using OFDMA or OFDM.

Each of the ports 250-$n$ are coupled to the controller 253 for operation of the base station 205. Each of the ports employs conventional OFDM demodulation and modulation techniques for receiving and transmitting communication signals respectively, such as packetized signals, to and from the base station 205 under the control of the controller 253. The packetized signals can include, for example, voice, data or multimedia information, and control information. As used herein, the term "data" can refer to, for example, data generated by applications, a network management entity, or any other higher-layer protocol entities that may use the IEEE 802.16 Media Access Control (MAC) layer to transfer information. Examples of user data include, for example, packets generated by voice, video, e-mail, file transfer applications and network management agents. As used herein, the term "control information" can refer to, for example, messages and signaling used by the IEEE 802.16 MAC layer and physical (PHY) layer to carry out its own protocol functionality. Control information includes periodic control information and aperiodic control information. As used herein, the term "periodic control information" can refer to, for example, preambles, midambles, synchronization sequences, timing and frequency correction channels or any other signaling used to ensure correct reception of the messages transmitted in a frame. Examples of periodic control information include, for example, frame control information such as a frame control header (FCH), a synchronization channel, preamble information, information regarding the frame structure, markers which flag the start of the frame, a downlink MAP (DL-MAP) message and other types of control information. As used herein, the term "aperiodic control information" can refer to, for example, messages transmitted aperiodically to ensure proper protocol behavior and station upkeep. Examples of aperiodic control information include, for example, management and control information, such as capability announcements, ranging messages, measurement reports, and handoff instructions.

Among other modules (not illustrated), the controller 253 includes a scheduler module 259 that includes a proactive scheduler module 255 and a reactive scheduler module 257. The scheduler module 259 and the parameters utilized therein can be hard coded or programmed into the base station 205 during manufacturing, and/or can be programmed over-the-air upon customer subscription, and/or can be a downloadable application. Other programming methods can be utilized for programming the scheduler module 259 into the base station 205. In one implementation, the scheduler module 259 can be implemented within the controller 253 as illustrated, or alternatively can be an individual preprocessing module communicatively coupled to the controller 253 (not shown).

To perform the necessary functions of the base station 205, the controller 253 is coupled to the memory 262, which preferably includes a random access memory, a read-only memory (ROM), an electrically erasable programmable read-only memory (EEPROM), and flash memory. The memory 262 can be integrated within the base station 205, or alternatively, can be at least partially contained within an external memory such as a memory storage device. The memory storage device, for example, can be a subscriber identification module (SIM) card.

Figure 3:
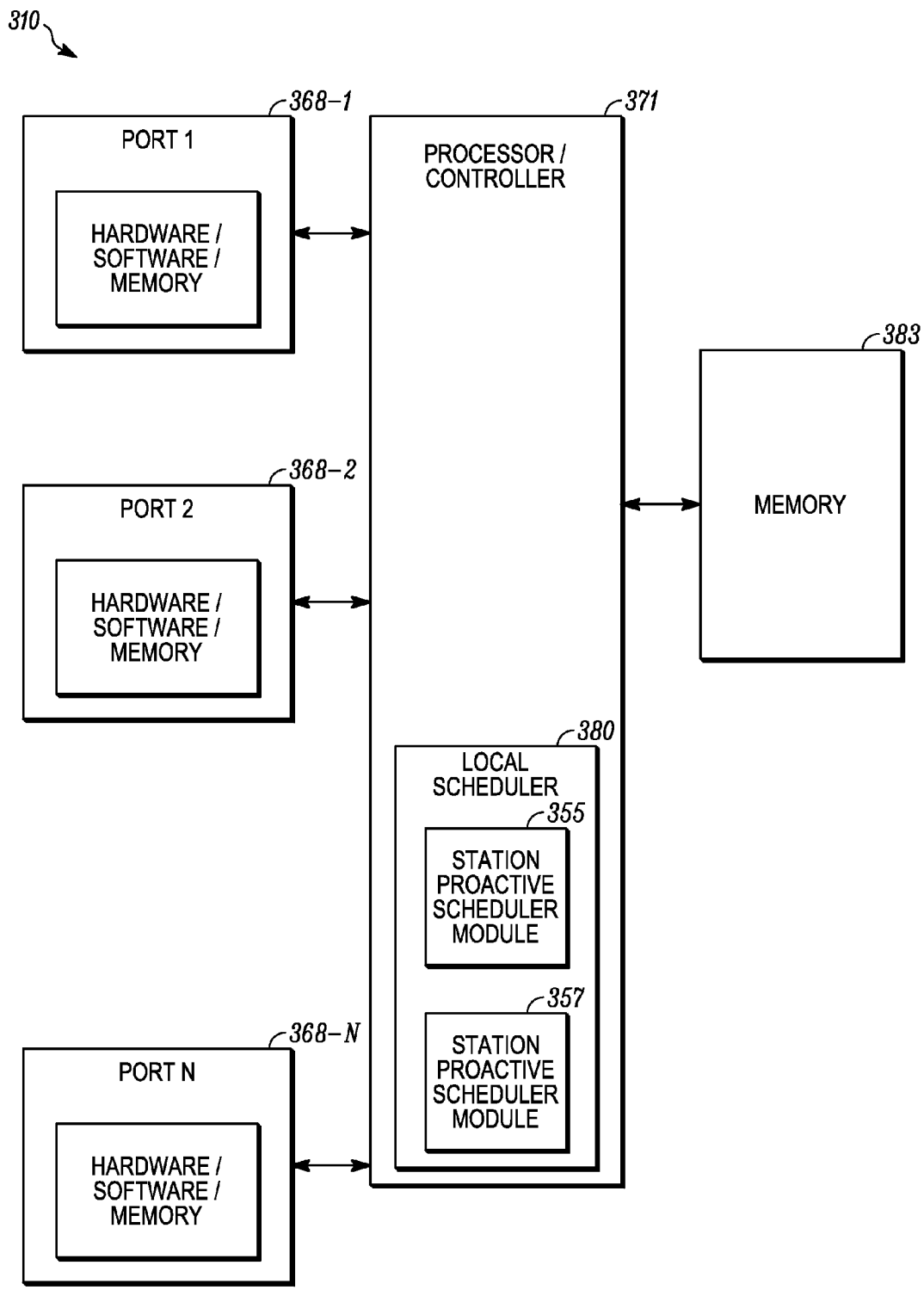
FIG. 3 illustrates an example of a station (STA) in accordance with some embodiments of the present invention.

FIG. 3 illustrates a station 310 in accordance with some embodiments of the present invention. As illustrated, the station 310 comprises a plurality of ports 368-$n$. Each port 368-$n$ may be designated for use as, for example, an IEEE 802.16 port. For example, the plurality of ports 368-$n$ can include an IEEE 802.16 port, which is used to communicate with a base station and/or one or more other stations. An IEEE 802.16 port, for example, provides an endpoint or "channel" for 802.16 network communications by the station 310 with base station 205, and can be used to transmit and receive both data and control/signaling/management information.

The station 310 further comprises a controller 371 and a memory 383. Each of the ports 368-$n$ are coupled to the controller 371 for operation of the station 310. Each of the ports employs conventional demodulation and modulation techniques for receiving and transmitting communication signals to and from the station 310, respectively, under the control of the controller 371. The packetized signals include those described above.

The controller 371 includes a local scheduler module 380 that includes a proactive sceduler module 355 and a reactive scheduler module 357. The local scheduler 380 and the parameters utilized therein can be hard coded or programmed into the station 310 during manufacturing, can be programmed over-the-air upon customer subscription, or can be a downloadable application. Other programming methods can be utilized for programming the local scheduler 380 into the relay station 310. The local scheduler 380 can be contained within the controller 371 as illustrated, or alternatively can be individual modules operatively coupled to the controller 371 (not shown). The operation of each of these modules will be described herein.

To perform the necessary functions of the station 310, the controller 371 and the local scheduler 380 are each coupled to the memory 383, which preferably includes a random access memory, a read-only memory (ROM), an electrically erasable programmable read-only memory (EEPROM), and flash memory. The memory 383 can be integrated within the station 310, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes an interface for communicating with the station 310.

Embodiments that will be described below relate to scheduling communication resources. An example of resources scheduled by a base station will now be described with reference to FIG. 4.

Figure 4:
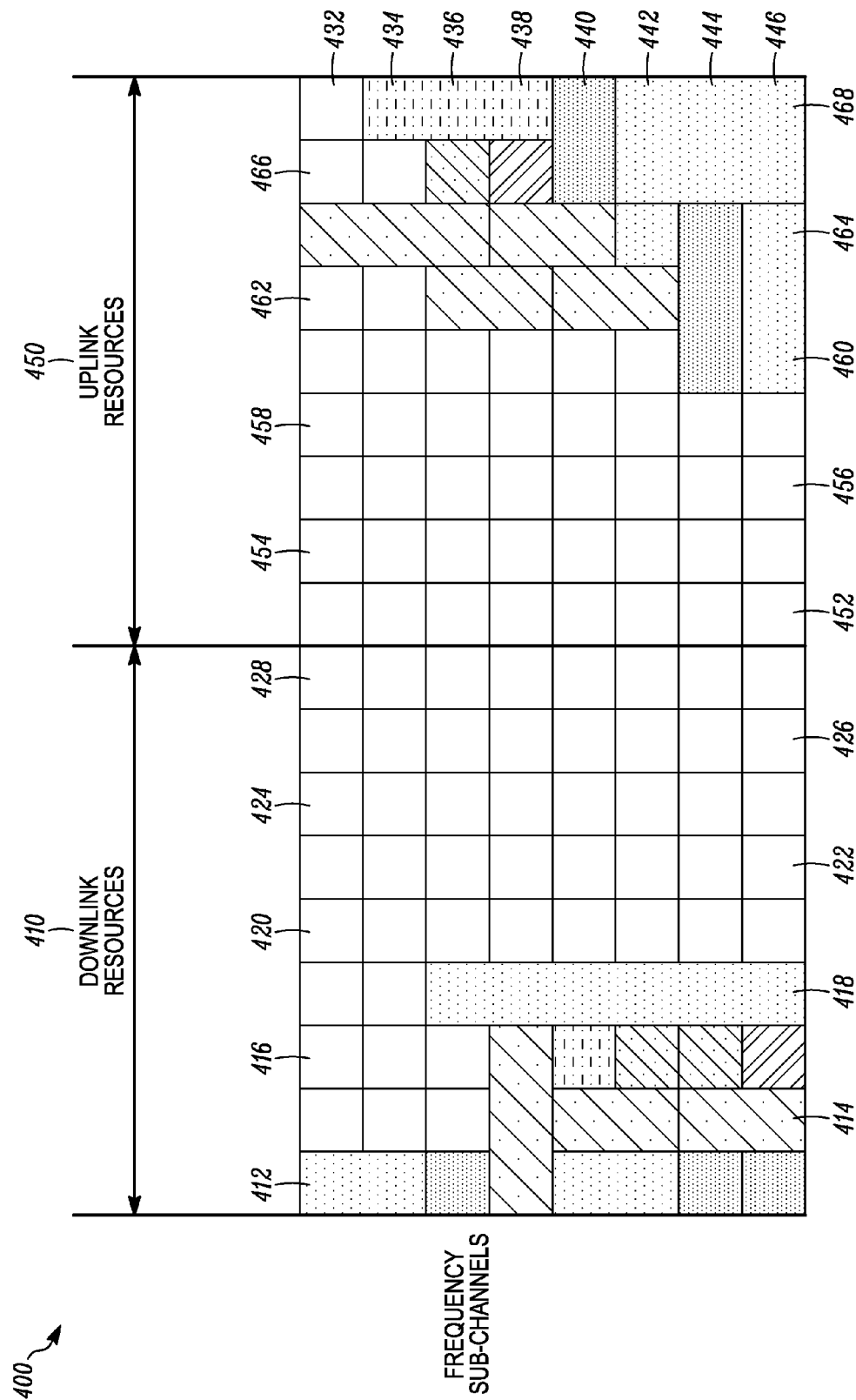
FIG. 4 illustrates resource allocations within a single OFDMA frame with resources split into uplink resources in an uplink portion of the frame and downlink resources in a downlink portion of the frame in accordance with some embodiments.

FIG. 4 illustrates resource allocations within a single OFDMA frame 400. In the OFDMA frame 400 resources are split into uplink resources in an uplink portion 450 of the frame 400 and downlink resources in a downlink portion 410 of the frame 400 for a TDD embodiment. Individual resource allocations within the frame 400 are shown as shaded rectangles. In other words, the shaded rectangles are resources that have been allocated to particular stations. These allocated resources are also maintained by the base station in a list called a resource allocation map. The downlink and uplink portions 410, 450 are groups of time slots that can also be called, for example, uplink and downlink sub-frames or zones. Typically, the size in time of the frame 400 is fixed whereas the partition between downlink and uplink portions 410, 450 can be adjusted. The partition between downlink and uplink portions 410, 450 of the frame 400 and resource allocations of the frame 400 are maintained in a resource allocation map located in the base station memory in accordance with some embodiments. The resource allocation map includes entries for all downlink (DL) resources and all uplink (UL) resources of the base station, and also specifies which ones of the DL and UL resources are currently/presently allocated and to which stations those resources are currently/presently allocated (if at all).

In this embodiment, time division duplexing (TDD) is implemented such that the uplink and downlink are allocated different (non-overlapping) time-periods of the frame. As noted above, OFDM modulation is implemented for downlink (DL) and uplink (UL) communications, and a particular frequency band is divided into multiple OFDMA time slots. Each time slot has a number of subcarriers/sub-channels of a wideband channel. In the resource allocation map, the time slots correspond to the vertical columns 412-428 and 452-468 of the frame 400, where the group of time slots define an OFDMA frame 400. The subcarriers/sub-channels 432-446 correspond to horizontal rows of the frame 400, where the same subcarriers/sub-channels are used for both uplink and downlink.

Although not illustrated, the resource allocation map could also include specific dedicated "zones." These dedicated zones are portions of the frame 400 that are reserved exclusively for or dedicated to direct station-to-station (i.e., "ad hoc" or "peer-to-peer") communication links, or alternatively, for direct station-to-relay station communication links. Thus, in one embodiment, direct station-to-station communication links can be interspersed with normal station-to-BS uplinks. In another embodiment, a subset or region or zone of time slots in the uplink (UL) portion/zone 450 of the frame 400 can be dedicated or devoted exclusively to direct station-to-station communication links. In this exclusive region, no station-to-BS traffic is allowed or scheduled.

In one embodiment, the base station implements a front-back scheduler module. DL resource allocations are allocated in a downlink (DL) portion/zone 410 of the frame 400 (i.e., time slots at the front of the frame 400), and UL resource allocations are allocated in an uplink (UL) portion/zone 450 of the frame 400 (i.e., time slots at the rear of the frame 400). As such, the resource allocation map includes a downlink (DL) portion/zone 410 of downlink resources that are to be allocated for downlink communications and an uplink (UL) portion/zone 450 of uplink resources that are to be allocated for uplink communications.

Each shaded-rectangle in FIG. 4 represents a frequency subcarrier/sub-channel and time slot allocation to a particular station for a particular communication link (either with the base station or with another station). In this example, it is assumed that a diversity subcarrier/sub-channelization scheme is implemented such that different subcarriers/sub-channels within one time slot can be allocated to different stations in any order. Moreover, the subcarriers/sub-channels assigned to a particular station can vary from time slot to time slot (i.e., subcarriers assignments do not need to follow the same pattern in each time slot). FIG. 4 will be referenced and described in greater detail below.

In the description that follows, it is assumed that resources for direct station-to-station (i.e., "ad hoc" or "peer-to-peer") communication links are allocated from uplink resources in the uplink (UL) portion/zone 450 of the OFDMA frame 400. It will be appreciated by those of ordinary skill in the art that, in other embodiments, resources for direct station-to-station (i.e., "ad hoc" or "peer-to-peer") communication links can be allocated from downlink resources in the downlink (DL) portion/zone 410 of the OFDMA frame 400.

Information Elements and Response Messages

To enable scheduling of uplink resources for peer-to-peer or station-to-station communication links, embodiments disclosed herein define new broadcast information elements (IEs) and unicast response messages (RMs) that are used in conjuction with the various embodiments described below. Prior to describing various embodiments, various information elements (IEs) that can be used in conjunction with these embodiments will now be described in detail. The new information elements include a resource map information element (RMIE) and a grant metric information element (GMIE) that will be described with respect to FIGS. 5 and 6, respectively. In one non-limiting implementation, the RMIE and GMIE are transported over-the-air (OTA) from a base station using a beacon signal; however, it will be appreciated by those skilled in the art that the RMIE and GMIE can be transported using a wide variety of other mechanisms or messages. Other potential information sources that could be used to carry information included in the RMIE and GMIE include routing messages, active and passive probe messages, hello messages and channel estimation measurements.

In addition, the new response message include a resource map response message (RMRM) and a grant metric response message (GMRM) that will be described below with regard to FIGS. 7 and 8, respectively. The RMRM and GMRM are unicast over the air from particular stations to a base station. As will be described below, the RMIE (FIG. 5) and RMRM (FIG. 7) are exchanged in a proactive scheduling method and the GMIE (FIG. 6) and GMRM (FIG. 8) are exchanged in a reactive scheduling method.

FIG. 5 illustrates a resource map information element (RMIE) 500 that is generated and broadcast by a base station (BS) in accordance with some embodiments. In some implementations, the base station can periodically broadcast the RMIE. When implemented in a WiMax-type system, the RMIE can be placed in the control portion of each frame so that WiMax-enabled stations can decode these control messages each time a frame is received. In some implementations, the RMIE 500 can be located near the beginning of a frame so stations have adequate time to decode the RMIE 500. The RMIE 500 implicitly indicates that peer-to-peer traffic is allowed by the base station due to the fact that the RMIE 500 is transmitted. The RMIE 500 describes information that is used to request partial resource allocation maps (PRAMs) from stations desiring new resource grants. A PRAM is communicated from a base station so that a station knows which resources in a resource allocation map to monitor so that the station does not have to monitor the entire set of resources. Resources specified in a PRAM can be presently free or presently allocated. In other words, each PRAM 530 specifies resources that the base station wants more information about; a station can select at least some of these resources in the PRAM (or all of the resources in the PRAM) to monitor, monitor this selected subset of resources, make measurements with regard to these resources, and then report the measurements back to the base station in an RMRM (FIG. 7). In the description that follows, one example will be described in which a particular Radio Frequency (RF) quality metric, namely Receive Signal Strength (RSS) power levels, is used to describe measurements made by stations. However, in other embodiments equivalent metrics (or combinations of equivalent metrics) can be used in conjunction with the methods described below. Examples of these equivalent metrics can include, but are not limited to, Signal-to-Noise Ratio (SNR), Signal-to-interference-plus-Noise Ratio (SINR) and range. For example, in one implementation, receive signal strength (RSS) and/or SINR measurements can be requested by the base station in an RMIE 500. In one specific implementation, that is described below, the base station uses the RMIE 500 to request information from the stations that categorizes receive signal strength (RSS) power levels received for a portion of the resource map. Alternatively, other radio frequency (RF) quality metrics can be measured with respect to the selected OFDMA resources. Range can be used in addition to RSS, SNR or SINR. Range can be measured by looking at timing differences between packet timestamps made by a transmitter and receive times (assuming the transmitter and the receiver can synchronize to a common signal), then multiplying those changes by the speed of light (c) to get range. Range can also be obtained via Global Positioning System (GPS) measurements at stations that have GPS capability. The base station changes the content of the RMIE 500 either periodically or dynamically based on changes in traffic load and/or traffic type.

The RMIE 500 includes an information element identification number (IE ID#) field 510 that is a a unique identification number for the RMIE 500, an information element size (IE size) field 520 that is used to specify the size (in bytes) of the RMIE 500, a time slot start field 535 that specifies the starting location of the PRAM 530 within the resource allocation map, a number of time slots field 540 that specifies the number of time slots over which a station is to take RSS measurements (the PRAM 530 does not specify sub-channels), a resource type (Resource Type) field 550 that is used to specify a type of resource for which a station is to report RSS measurements in its RMRM (FIG. 7), a maximum number of reports (Max # Reports) field 560 that is used to specify a maximum number of measurements to include in the station's RMRM (FIG. 7), and a RSS Power Categories field 570 in which each bit identifies whether or not a particular RF quality metric category should be included in the station's RMRM (FIG. 7). In one implementation, the resource type field 560 can include both resource and measurement type. In this manner, for instance, the base station can request SINR measurements over a time slot, or SINR measurements over both time slots and frequency sub-channels, or RSS measurements over a time slot, or RSS measurements over both time slots and frequency sub-channels. Additional details regarding one implementation of the fields of the RMIE 500 are provided below in Table 1.

TABLE 1

| Field | Size | Description |
|---|---|---|
| IE ID # | 1 byte | Specifies unique identification number for Resource Map IE |
| IE Size | 1 byte | Specifies size in bytes of the IE |
| Time slot Start | 1 byte | Specifies starting location of PRAM within resource allocation map; can be set to zero to indicate that base station is letting station decide which time slots to scan |
| # Time slots | 4 bits | Specifies a number of time slots to indicate how wide the PRAM is over which a station can take RSS measurements<br>0000: No measurements<br>0001: 2 time slots<br>0010: 4 time slots<br>...<br>1111: All time slots |
| Resource Type | 2 bits | Specifies type of resource that a station reports in response message:<br>00: RSS for Timeslots only<br>01: RSS for Timeslot & Frequency<br>10: RSS for Grants (Blocks of Time & Frequency) |
| Max # Reports | 5 bits | Specifies maximum number of partial resource allocation map measurements to include in the station response message |
| RF Quality Metric Category | 3 bits | Each bit identifies whether or not a particular RF quality metric category should be included in the station response message:<br>xx1: Include High Category RSS measurements<br>x1x: Include Medium Category RSS measurements<br>1xx: Include Low Category RSS measurements |

Thus, upon receiving the RMIE, a station measures RSS information described by the RMIE 500 for selected ones of the time slots specified in the RMIE 500, sorts its RSS measurements into groups or categories (e.g., high RSS, medium RSS, low RSS, etc.), and then reports this information in a RMRM that is described below with reference to FIG. 7.

FIG. 6 illustrates a grant metric information element (GMIE) 600 that is generated and broadcast by a base station (BS) in accordance with some embodiments. In one implementation, the GMIE 600 can be broadcast by the base station in a beacon message. The GMIE 600 is used to inform destination/receiver stations of measurements that must be provided when requesting a change in their current resource allocation. The information requested covers the time slots for the current grant. The requested information is eventually used by the base station to improve peer groupings and to assess whether a resource re-allocation is warranted. As noted above, the GMIE 600 is only "used" during a reactive scheduling method for "reallocating" resources that are granted to a particular station. Although the GMIE 600 is broadcast and received by all stations (within communication range), the GMIE 600 is only processed by destination/receiver stations involved in an active communication session since only those stations can collect QoS metrics requested by the base station via the GMIE 600.

The GMIE 600 includes an information element identification number (IE ID#) field 610 that is a unique identification number for the GMIE 600, an information element size field 620 that is used to specify the size (in bytes) of the GMIE 600, a measurement type (Meas. Type) field 630 that is used to specify to the station a type of QoS measurement that is to be reported by the station in the GMRM (FIG. 8), a measurement quality field 640 that is used to specify to the station how many frames 400 to average for each measurement provided, and in some implementations, can be used to specify algorithms for combining measurements. In this specific embodiment, the QoS metrics 630 specified include frame error rate (FER), SINR, and Analog-to-Digital Converter desense. However, in other embodiments, additional QoS metrics can be specified. For example, in an alternative embodiment, the GMIE can specify QoS metrics regarding the amount of peer-to-peer traffic, the rate the traffic mix changes, cell load, etc. Additional details regarding one implementation of the fields 610-640 of the GMIE 600 are provided below in Table 2.

TABLE 2

| Field | Size | Description |
| --- | --- | --- |
| IE ID # | 1 byte | Specifies a unique identification number for the Grant Metric IE |
| IE Size | 1 byte | Specifies size in bytes of the IE |
| Meas. Type | 3 bits | Specifies type of Measurement<br>000 No measurements<br>xx1 Include FER<br>x1x Include SINR<br>1xx Include ADC Desense |
| Meas. Quality | 4 bits | Measurement quality tells the station how many frames to average for each measurement provided. Algorithms for combining measurements could also be specified. |

Thus, any station that is in a communication session and would potentially require/desire a new resource allocation, upon receiving the GMIE 600, measures QoS metrics described by the GMIE 600 for each time slot that it has been allocated. For example, if a receive station is receiving in time slots 3 and 4, then it would measure QoS metrics during the communication session on time slots 3 and 4. The station then reports these QoS metrics in a GMRM that is described below with reference to FIG. 8.

As will be described below, as traffic changes from base station-to-station to peer-to-peer, the base station can adjust the RMIE 500 and/or GMIE 600 to adjust the amount of information collected by the stations and sent to the base station for creation of the peer sets needed to prevent near-far scheduling issues. The base station also adjusts the RMIE 500 and the GMIE 600 to request an increase or decrease in destination/receiver station (B) measurements based on the base station perception of how error free the communication session is. For low loading and/or little peer-to-peer traffic, little additional uplink resource information is needed. Only a small amount of uplink RSS resource information and QoS metrics are required from destination/receiver stations (B). If this is insufficient for the base station to figure out what is happening, it can put in a temporary request for additional information from a specific destination/receiver station (B). In one implementation, a base station can have a particular station that it has trouble scheduling. The base station can unicast an RMIE to this station that requires different measurements than the standard broadcast RMIE. For example, for high loading and/or high peer-to-peer traffic the RMIEs and GMIEs can request more destination/receiver station (B) information. For example, in a large room (trade show, conference hotel), more information regarding uplink resources can be requested from a given localized area. The base station may also use the RMIE or GMIE as a unicast probe request to a specific destination/receiver station (B) to ask for more detailed uplink resource information than is required by the regular RMIE and GMIE. A probe to one destination/receiver station (B) requesting a full local map can greatly resolve peer grouping issues in some situations. Using unicast requests for additional information via the RMIE and GMIE can provide the information needed by a base station to improve peer group sets (described below) without significant network overhead.

FIG. 7 illustrates a resource map response message (RMRM) 700 that is generated and unicast by a station in accordance with some embodiments. The RMRM 700 from the station is designed to reduce network traffic. When requesting resources, the station will send the requested partial resource allocation map information along with a grant request. In some embodiments the RMRM 700 may be sent to the base station periodically. One implementation of the RMRM 700 sent by stations will now be described below.

The RMRM 700 includes response message identification number (RM ID#) field 710 that is a unique identification number for this RMRM 700, a response message size field 720 that is used to specify the size in bytes of the RMRM 700, and a resource type (Resource Type) field 730 that is used to specify a type of resource that this station is reporting in the RMRM 700, and a total categories (Total Categories) field 735 to specify the total number of different RF quality metric categories reported in RMRM 700. The type of resource was previously included in the RMIE 500, but it is included again in the RMRM 700 since a base station has the option of changing the default resource type at any time, and therefore needs to know what type of resource measurement is being specified in the RMRM 700. As in the description above and in the description that follows, one example will be described in which a particular RF quality metric, namely RSS, is used to describe measurements made by and reported stations. However, in other embodiments equivalent metrics (or combinations of equivalent metrics) can be used in conjunction with the methods described below. Examples of these equivalent metrics can include, but are not limited to, range, SNR and SINR. For example, in one implementation, RSS and/or SINR measurements can be reported to the base station in the RMRM 700. In one implementation, the resource type field 730 can include both resource and measurement type. In this manner, for instance, the base station can request SINR measurements over a time slot, or SINR measurements over both time slots and frequency sub-channels, or RSS measurements over a time slot, or RSS measurements over both time slots and frequency sub-channels.

The RMRM 700 also includes a partial resource measurement map (PRMM) 740 that includes information regarding RSS measurements made by a particular station for selected ones of the resources specified in the PRAM 530 specified in the RMIE 500 of FIG. 5. The PRMM 740 is used to report the measurements requested and specified in the RMIE 500, and the category MAP data fields 748, 758, 768 are used to specify the specific sub-channels and time slots. For example, in the PRMM 740 illustrated in FIG. 7 includes four fields 742, 744, 746, 748 that are used by the station to report RSS measurements for RSS power category 1, and although not explicitly illustrated in FIG. 7, can also include four additional fields 752-758 (not illustrated) for RSS power category 2 that are similar to those for category 1, and four fields 762-768 (not illustrated) for RSS power category 3 that are also similar to those for category 1. In this implementation, the three RSS power categories correspond to high power RSS measurements (category 1), medium power RSS measurements (category 2), and low power RSS measurements (category 3). In an alternative embodiment of this invention, fewer or more RSS power categories can be present. Thus, the PRMM 740 following the total categories field 735 can specify a number of RSS power category fields (three in the example above). For each RSS power category reported by the station, there are four fields that are used to define and provide information for that particular RSS power category. For instance, in implementations where there are three RSS power categories, the total categories field 735 will be set to 3 and there will be a total of twelve fields—four fields 742-748 for category 1, four fields 752-758 for category 2, and four fields 762-768 for category 3.

In the example illustrated in FIG. 7, the category 1 RSS power category field 742 identifies the RSS power measurement category that applies for: a number measured (Category 1 # Meas.) field 744, and a valid (Category 1 Valid) field 746 and a map data (Category 1 Map Data) field 748. In this implementation, the category 1 RSS power category field 742 can be a 3 bit variable that can be set to 0 to indicate high RSS. The number measured (Category 1 # Meas.) field 744 can be a 4 bit variable that specifies a number of high RSS measurements that are included for the Category 1 RSS measurements. The valid (Category 1 Valid) field 746 indicates whether or not each of the category 1 RSS measurements contained a valid preamble (i.e., whether the receiver was also able to decode the preamble, and if so that the measured RSS signal is valid for the system of interest opposed to being wireless interference from some other competing system). Valid field 746 can be used when making decisions about resource availability in unlicensed spectrum where competing wireless signals are likely to occur in the operating frequency bands. The valid filed 746 is not needed in some implementations such as those operating in licensed WIMAX spectrum. When the valid field 476 is implemented, the station uses 1 bit per RSS measurement to provide the information in the valid (Category 1 Valid) field 746. The map data (Category 1 Map Data) field 748 specifies the map information requested from and reported to the base station and includes resource allocation map locations (time slot, frequency sub-channel) for the category 1 RSS measurements. In one implementation, the field 748 "Category 1 Map Data" specifies a tile that defines a time slot and one or more sub-channel frequency for each measurement. Although the map data (Category 1 Map Data) field 748 is illustrated using a single row for purposes of simplicity, it is to be appreciated that the map data (Category 1 Map Data) field 748 can include multiple entries or rows, where each entry or row specifies specific measurement data for a particular resource (i.e., particular time slot and a particular frequency sub-channel). In other words, the map data (Category 1 Map Data) field 748 can include one entry for each resource (i.e., particular time slot and a particular frequency sub-channel) that was measured and is categorized in category 1. In an alternative embodiment, each entry can include a two-dimensional resource region (or tile) of the form [Ts1, Ts1, Ts2, Fs2 . . . ]. For example, the entry [Ts1, Ts1, Ts2, Fs2] would describe a region of time slots Ts1 to Ts2 and frequency subchannels Ts1 to Fs2, where all RSS measurements over those resources are specified within the RF quality metric category field 742. Additional details regarding one implementation of the fields of the RMRM 700 are provided below in Table 3.

TABLE 3

| Field | Size | Description |
|---|---|---|
| RM ID # | 1 byte | Specifies a unique identification number for this RM |
| RM Size | 1 byte | Specifies size in bytes of the RM |
| Resource Type | 2 bits | Specifies type of resource that a station reports in response message:<br>00: Timeslots only<br>01: Timeslot & Frequency<br>10: Grants (Blocks of Time & Frequency) |
| Total Categories | 3 bits | Identifies the total number of RSS power categories in the remainder of the table. Each category will contain 4 fields. |
| Category 1 RSS Power Category | 3 bits | Identifies which RSS power measurement category applies for the following 3 fields (# Meas, Valid, Map Data).<br>001: High Power RSS measurements<br>010: Medium Power RSS measurements<br>100: Low Power RSS measurements |
| Category 1 # Meas. | 4 bits | Specifies a number of resource map measurements included for the Category 1 RSS measurements. |
| Category 1 Valid | 1 bit/meas | Indicates whether or not each of the category 1 RSS measurements contained a valid preamble. |
| Category 1 Map Data | 6-10 bits/meas | Specifies resource map locations (time slot, frequency) for the category 1 RSS measurements |
| . . . | . . . | . . . |

A few examples of the content of the PRMM 740 will now be described to provide context.

For instance, when the base station had requested, via the RMIE 500, measurements over the region of time slots 15-20 of the resource allocation map, an example of the category 1 RF quality metric category could be as follows:

Category 1 RSS Power Category=[0] (to indicate high RSS);
Category 1 # RSS Measurements=[3];
Category 1 Valid system for measurement 1=[1];
Category 1 Valid system for measurement 2=[1];

Category 1 Valid system for measurement 3=[0] (to indicate that the receiver could not decode this signal so there may be external interference or really bad channel conditions);
Category 1 Map Data for measurement 1=[sub-channel=3], [time slot=16];
Category 1 Map Data for measurement 2=[sub-channel=5], [time slot=18]; and
Category 1 Map Data for measurement 3=[sub-channel=7], [time slot=19].

By contrast, when the base station requests measurements over the resource region that includes sub-channels 3-10 and time slots 15-20, the PRMM 740 can include:
Category 1 RSS Power=[0] (to indicate high RSS);
Category 1 # RSS Measurement=[3];
Category 1 Valid system for measurement 1=[1];
Category 1 Valid system for measurement 2=[1];
Category 1 Valid system for measurement 3=[0] (to indicate that the receiver could not decode this signal so there may be external interference or really bad channel conditions);
Category 1 Map Data for measurement 1=[sub-channel=3], [time slot=4];
Category 1 Map Data for measurement 2=[sub-channel=5], [time slot=10]; and
Category 1 Map Data for measurement 3=[sub-channel=7], [time slot=14].

In addition, a particular implementation of a station can specify one, two or three sets of category map data 748, 758, 768. For instance, if the station also reports three low RSS measurements then it has to include a set of Category 2 measurements analogous to those above.

As noted above, a station can measure RSS information described by the RMIE 500 for selected ones of the time slots specified in the RMIE 500, and sort its RSS measurements into groups or categories (e.g., high RSS, medium RSS, low RSS, etc.).

In one implementation, category 2 can be used to specify a group of low RSS measurements. For instance, a station can also report three low RSS measurements as a set of Category 2 measurements as follows:
Category 2 RSS Power Category=[1] (to indicate low RSS);
Category 2 # RSS Meas=[3];
Category 2 Valid system for measurement 1=[0] This low power signal was invalid;
Category 2 Valid system for measurement 2=[1];
Category 2 Valid system for measurement 3=[1];
Category 2 Map Data for measurement 1=[sub-channel=4], [time slot=17], [sub-channel=6], [time slot=17] (These form rectangles in the resource allocation map);
Category 2 Map Data for measurement 2=[sub-channel=6], [time slot=19], [sub-channel=6], [time slot=20]; and
Category 2 Map Data for measurement 3=[sub-channel=12], [time slot=18], [sub-channel=14], [time slot=20].

Notably, in the set of Category 2 measurements, the "Category_2 RSS Power Category" is set to a different value (1) to indicate that this measurement is for a low RSS power category.

FIG. 8 illustrates a grant metric response message (GMRM) 800 that is generated and unicast by a destination/receiver station (B) in accordance with some embodiments. A GMRM 800 is sent from a destination/receiver station (B) to a base station to report QoS metrics measured by the destination/receiver station (B) during a communication session or call. One implementation of the GMRM 800 sent by destination/receiver stations (B) will now be described below.

The GMRM 800 includes response message identification number (RM ID#) field 810 that is a unique identification number for this GMRM 800, an response message (RM) size field 820 that is used to specify the size in bytes of the GMRM 800, and a total categories field 830 indicating the number of measurement categories included in the remainder of the table.

In FIG. 8, two fields 842, 844, are illustrated for reporting a first QoS category measurement. In particular, the category measurement type field 842 identifies which QoS measurement category applies for a category 1 measurement (Category 1 Meas.) field 844 that specifies the station measurement. For instance, the category measurement type field 842 can indicate a frame-error-rate (FER) and the category 1 measurement (Category 1 Meas.) field 844 can include a value representing the number of frame errors measured. However, in some implementations, a destination/receiver station (B) can report additional QoS metrics such as Signal-to-interference-plus-Noise Ratio (SINR) and analog-to-digital converter (ADC) desense. In such implementations, there can be additional fields for specifying these additional QoS metrics. For instance, in an implementation, where the destination/receiver station (B) reports three QoS metrics (e.g., FER, SINR and ADC desense) there can be two additional fields 852, 854 (not illustrated) for reporting SINR measurements that are similar to those for category 1 and two more additional fields 862, 864 (not illustrated) for reporting ADC desense measurements that are also similar to those for category 1. In other words, following the total categories field 830, for each QoS metric being reported by the station, there are additional fields. With OFDMA, multiple transmitters can simultaneously desense a receiver. A destination/receiver station (B) can estimate ADC desense by comparing the RSS measurements across all sub-channels of the desired receive grant time slot(s). The difference between the sub-channel with the maximum RSS power level and the desired sub-channel RSS power provides an estimate of ADC desense. For example, each 6 dB of power difference represents at least 1 bit desense of the ADC. Intermodulation products may add more desense. Additional details regarding one implementation of the fields of the GMRM 800 are provided below in Table 4.

TABLE 4

| Field | Size | Description |
| --- | --- | --- |
| RM ID # | 1 byte | Specifies a unique identification number for this RM |
| RM Size | 1 byte | Specifies size in bytes of the RM |
| Total Categories | 3 bits | Identifies the total number of measurements in the remainder of the table. Each measurement will contain 2 fields. |
| Category 1 Meas. Type | 3 bits | Identifies which QoS measurement category applies for the following measurement field<br>001: FER<br>010: SINR<br>100: ADC Desense |
| Category 1 Meas. | 5 bits | Category 1 measurement |
| Category 2 Meas. Type | 3 bits | Identifies which QoS measurement category applies for the following measurement field<br>001: Cat 1: FER<br>010: Cat 2: SINR<br>100: Cat 3: ADC Desense |
| Category 2 Meas. | 5 bits | Category 2 measurement |
| ... | ... | ... |

Scheduling

Embodiments of the present invention generally relate to protocols, methods and apparatus for scheduling uplink communication resources within a cell of an OFDMA communication system. For example, the disclosed embodiments can provide MAC-layer scheduling methods and OFDMA scheduling apparatus for scheduling uplink communication resources in time-division duplex (TDD) or frequency division duplex (FDD) wide area wireless OFDMA communication networks (e.g., WiMAX/IEEE 802.16, 3GPP Long Term Evolution (LTE)).

More specifically, the disclosed protocols, methods and apparatus allow for scheduling of (1) uplink communication resources allocated for "normal" uplink communications from stations to a base station and (2) uplink communication resources allocated for "direct link" or peer-to-peer communication between stations. The disclosed scheduling methods and apparatus allocate uplink resources for "direct link" or peer-to-peer communication between stations such that near-far issues caused by peer-to-peer communication are reduced/avoided. The disclosed protocols, methods and apparatus can prevent peer-to-peer communication links using different sub-channels within the same time slot from creating near-far issues for other receiver stations that are within communication range. In other words, a base station schedules uplink communication resources that are used by stations to avoid scheduling resources in the same time slot such that near/far issues result.

Some of the disclosed embodiments, that will now be described below, relate to proactive scheduling methods for initial uplink resource allocation. In such embodiments, a proactive resource allocation method is provided in which a base station instructs stations how to collect appropriate information. The stations collect the information and send to the base station, which then uses the information to create and update peer-sets of the stations, and then schedules inter-peer resources and/or intra-peer resources.

Proactive Scheduling Methods for Initial Uplink Resource Allocation

Figure 9:
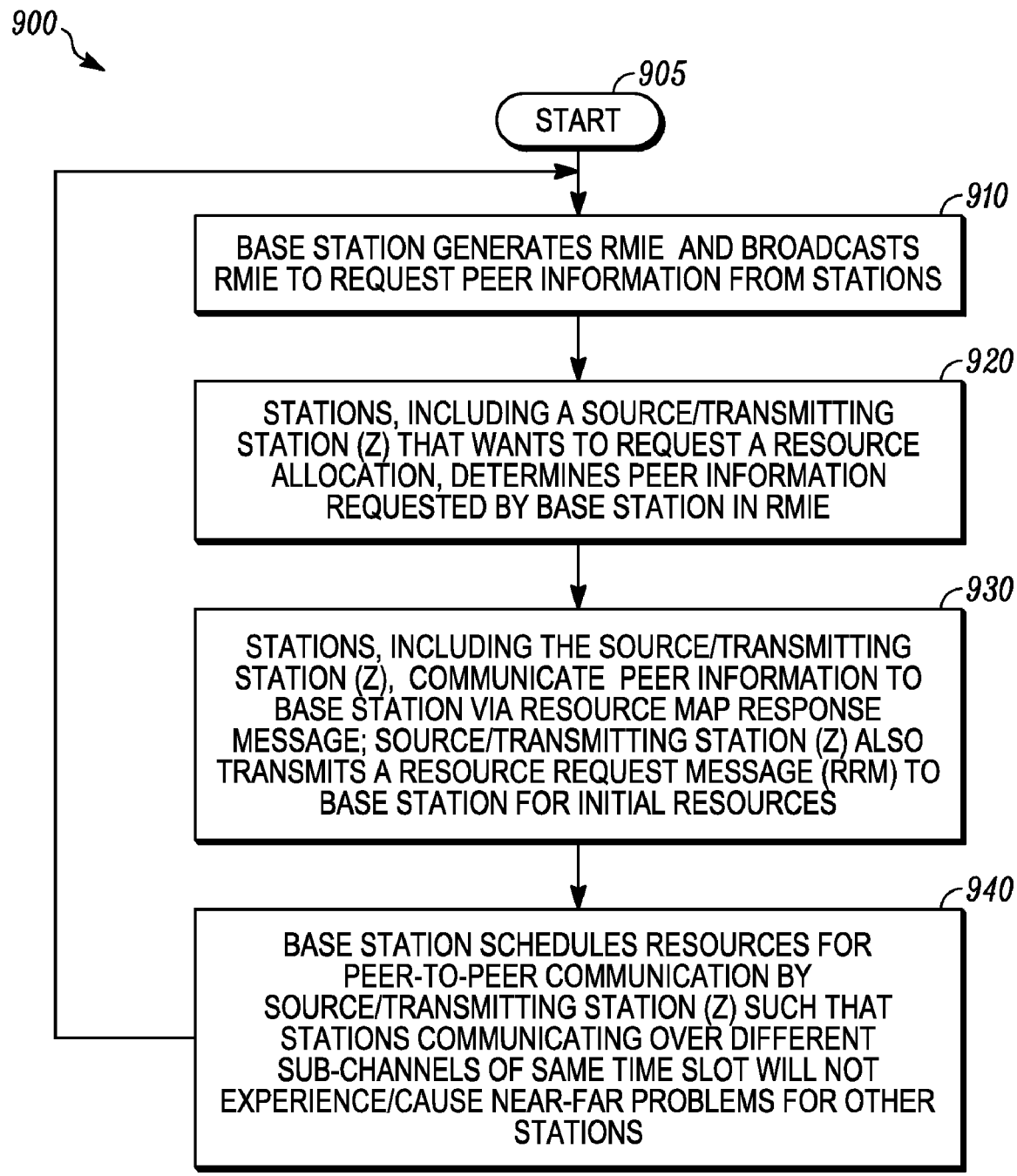
FIG. 9 illustrates proactive scheduling method for scheduling and allocating uplink (UL) resources in accordance with some embodiments.

FIG. 9 illustrates proactive scheduling method 900 for scheduling and allocating uplink (UL) resources in accordance with some embodiments. The proactive scheduling method describes acts (e.g., processing and communicating) that stations (STA) and base stations must do before the base station allocates uplink resources to the stations for peer-to-peer communications with other peer stations. In the proactive scheduling method, a base station (BS) and a source/transmitter station (Z) both participate, and therefore both have a proactive scheduler module (PSM). For sake of clarity, the respective scheduler modules are referred to below as a base station proactive scheduler module (BSPSM) and station proactive scheduler module (STAPSM), respectively.

The proactive scheduling method 900 begins at step 905. At step 910, the base station generates an RMIE (FIG. 5) and broadcasts the RMIE to request peer information from stations that receive the RMIE including the source/transmitter station (Z). In one implementation, the RMIE includes information to inform stations how many and what type of measurements to take for specified performance metrics (e.g., RSS, signal-to-interference-noise ratio (SINR)).

At step 920, the stations, including a source/transmitter station (Z) that wants to request a resource allocation, determine (measure or calculate) peer information (e.g., performance metrics) being requested by the base station based on information specified in the RMIE. At step 930, stations (including the source/transmitter station (Z)) communicate a RMRM (FIG. 6) to the base station. The RMRM includes peer information requested by the base station in the RMIE as determined by the source/transmitter station (Z). The source/transmitter station (Z) also transmits a resource request message (RRM) to the base station to request resources for a communication session or "call" with a destination/receiver station (B).

At step 940, the base station processes the RMRM (and RMRMs from other stations) and determines uplink resources to be allocated to the source/transmitter station (Z) for its communication with the destination/receiver station (B). In summary, the base station uses the information in station RMRMs to create rules for scheduling or allocating uplink resources to avoid causing near-far issues. The uplink resources allocated to the source/transmitter station (Z) are allocated such that stations communicating over different sub-channels of the same time slot(s) will not experience or cause near-far problems for other stations, including the source/transmitter station (Z), and likewise communications by the source/transmitter station (Z) over the uplink resources it has been allocated will not cause near-far problems for other stations.

For a given location, traffic characteristics may change over time, with different concentrations of base station-to-station and station-to-station traffic. As indicated by the feedback loop exiting step 940 and returning to step 910, the proactive scheduling methods can accommodate large changes over time in the amount of peer-to-peer traffic by dynamically adjusting the content of the RMIE and RMRM transmitted.

Figure 10:
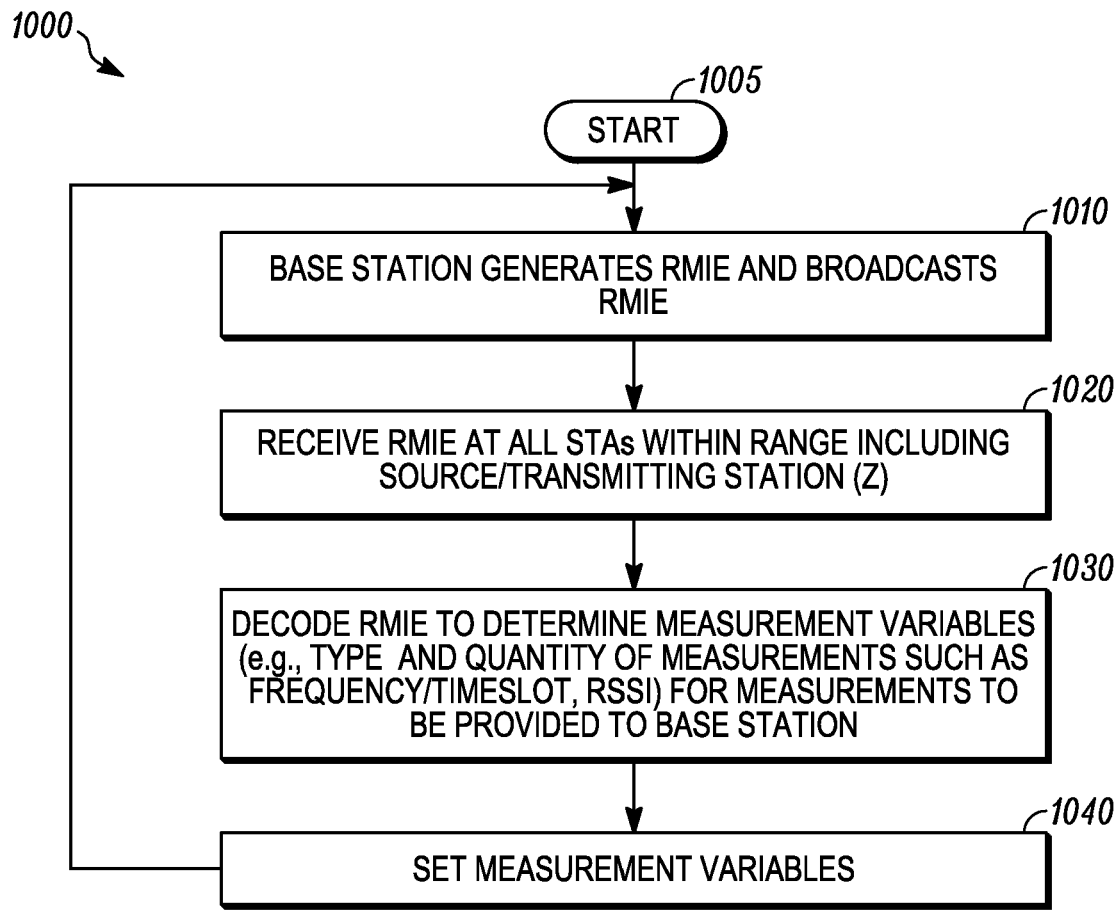
FIG. 10 is flow chart illustrating processing of an RMIE during a proactive scheduling method in accordance with some embodiments.
Figure 11:
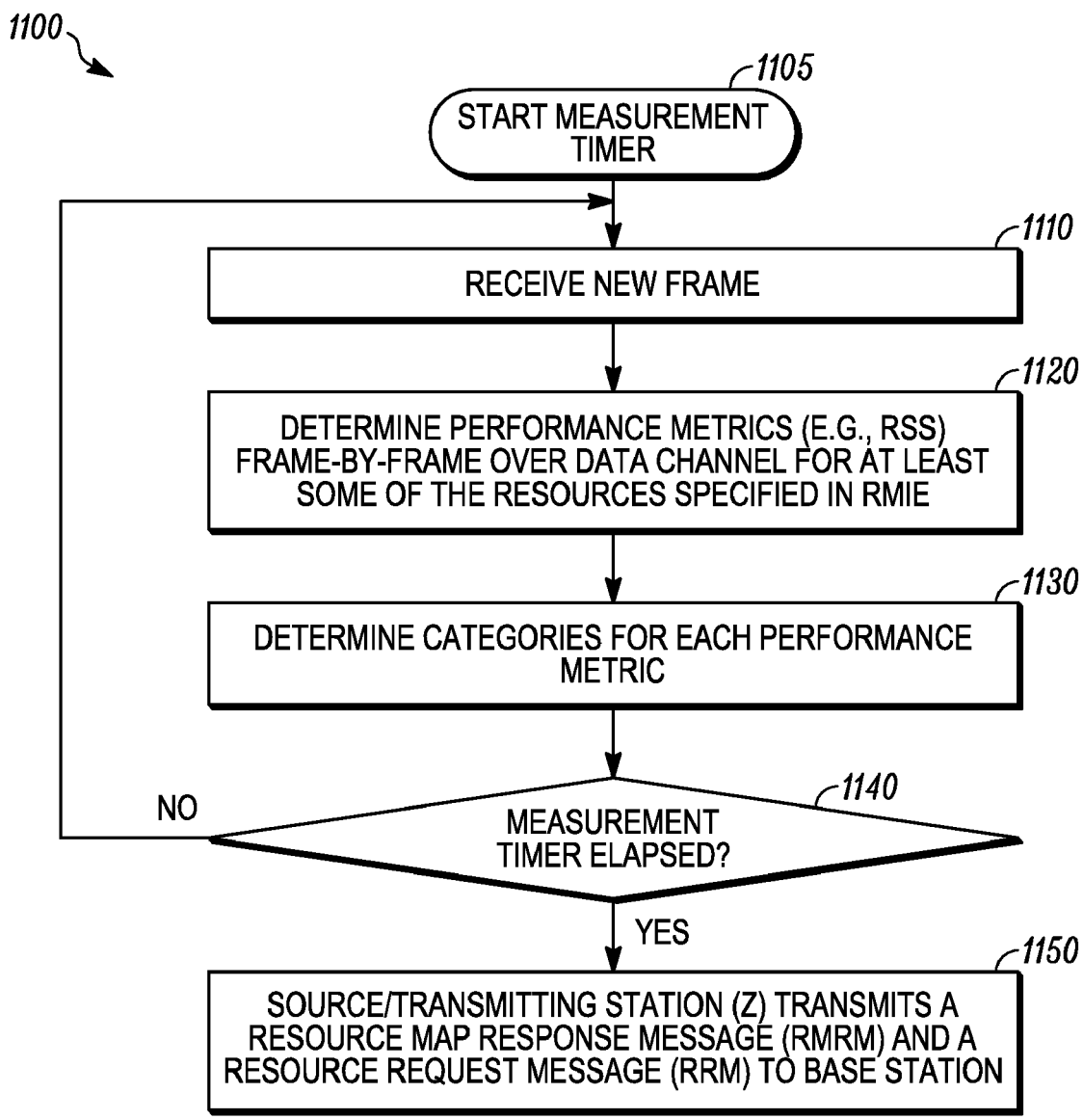
FIG. 11 is flow chart illustrating processing performed at a source/transmitter station (Z) during a proactive scheduling method in accordance with some embodiments.

In the description of FIGS. 10 and 11 that follows, processing performed at the source/transmitter station (Z) that is requesting a new uplink resource grant from a base station will be described. However, it will be appreciated that multiple source/transmitter stations can simultaneously request new uplink resource grants from the base station and that the base station can simultaneously receive uplink resource request messages (RRMs) from multiple stations. Accordingly, multiple source/transmitting stations can simultaneously perform the processing illustrated in FIGS. 10 and 11, and a base station can simultaneously perform the processing illustrated in FIGS. 12-15 for multiple source/transmitter stations (Z).

FIG. 10 is flow chart illustrating processing 1000 of an RMIE 500 during a proactive scheduling method 1000 in accordance with some embodiments.

As noted above, the base station maintains a resource allocation map, and at step 1010 regularly generates and broadcasts an RMIE 500 (FIG. 5). The RMIE 500 specifies a Partial Resource Allocation Map (PRAM) 530 that indicates portions of the resource allocation map that the base station would like more information about and would like the stations to provide more information about.

Prior to requesting an uplink resource grant, the source/transmitter station (Z) waits for the RMIE 500. When the source/transmitter station (Z) receives the RMIE 500 at step 1020, the method 1000 proceeds to step 1030, where the source/transmitter station (Z) of the station decodes the PRAM 530 of the RMIE 500 to determine which resource measurement variables are being requested by the base station in the RMIE 500.

In general, the resource measurement variables specify what information should be collected by the recipient stations. In one implementation, the resource measurement variables specify performance metrics (e.g., RSS) that are to be measured for particular uplink resources indicated in the PRAM 530.

At step 1040, the source/transmitter station (Z) sets the resource measurement variables and then processing then continues as illustrated in FIG. 11.

FIG. 11 is flow chart illustrating processing 1100 performed at a source/transmitter station (Z) during a proactive scheduling method in accordance with some embodiments. In particular, FIG. 11 illustrates processing 1100 performed at a source/transmitter station (Z) for measuring performance metrics (e.g., RSS) corresponding to measurement variables for selected uplink resources and then generating a resource map response message (RMRM) 700 that is transmitted to the base station.

At step 1105, the source/transmitter station (Z) starts a timer that specifies a resource measurement period, and begins to monitor an OFDMA channel for selected ones (or all of) the uplink resources specified in the RMIE 500 received from the base station. The resource measurement period is set such that the source/transmitter station (Z) will receive one or more OFDMA frames 400 transmitted on the OFDMA channel. The resource measurement period can be a standard value that is known to the source/transmitter station (Z) that is of a long enough duration to allow accurate measurements. This duration can vary depending upon the implementation. In one embodiment the resource measurement period is selected during system installation and downloaded to all stations.

At step 1110, the source/transmitter station (Z) monitors an OFDMA channel until it receives a new OFDMA frame 400 from the base station. The OFDMA frame 400 includes a preamble which defines when the OFDMA frame 400 starts.

Upon receiving the next OFDMA frame 400, at step 1120, the station begins determining (e.g., measuring and/or calculating) performance metrics for "selected" uplink resources specified in the PRAM 530 received from the BS. The stations do not need to determine (e.g., measure and/or calculate) performance metrics for all uplink resources specified in the PRAM 530, but can in some implementations. In some embodiments, the recipient stations are permitted to select particular ones of the uplink resources specified in the PRAM 530. For example, in one embodiment of step 1120, the source/transmitter station (i.e., a particular station that plans to request an uplink resource allocation from the BS) can select particular ones of the uplink resources specified in the PRAM 530, and monitor those selected uplink resources to determine performance metrics (e.g., RSS) associated with those selected uplink resources. In such embodiments, the portion of the PRAM 530 that is monitored is left up to the station. In one specific implementation, the station can randomly select uplink resources from the PRAM 530 or randomly select groups of uplink resources from the PRAM 530 to monitor. As will be described below, the performance metrics will eventually be used to generate a partial resource measurement map (PRMM) 740.

In one implementation of step 1120, the source/transmitter station (Z) measures receive signal strength (RSS) levels for the selected uplink resources. Each of the uplink resources is a combination of a time slot and frequency sub-channel. For each time slot of a selected uplink resource (i.e., that the source/transmitter station (Z) selects from the PRAM 530), the station scans all sub-channels in that time slot, down converts to baseband, filters then takes the fast Fourier Transform (FFT). The magnitude square of the output of the FFT is the power level for each frequency sub-carriers. The RSS of a given sub-channel is obtained by summing the power of the sub-carriers that make up that sub-channel. Each of the measured RSS values can be specified using a received signal strength indicator (RSSI), which is a measure of the received radio signal strength over a particular communication link.

At step 1130, the source/transmitter station (Z) categorizes the measured performance metrics into different categories. For instance, according to one implementation, the source/transmitter station (Z) categorizes the measured receive signal strength (RSS) levels into different categories (e.g., high, middle and low measured RSS levels).

At step 1140, the source/transmitter station (Z) determines whether the resource measurement period has expired. If not, then process 1100 loops back to step 1110.

If the resource measurement period has expired, then the process 1100 proceeds to step 1150, where the source/transmitter station (Z) uses the performance metrics it determined (measured or calculated) to generate a resource map response message (RMRM) 700 that includes a partial uplink resource measurement map (PRMM) 740 for uplink resources specified in the PRAM 530 that are selected by the source/transmitter station (Z). The PRMM includes performance metrics determined by the the source/transmitter station (Z) for selected uplink resources (time slot/frequency sub-channel). In the embodiment described above with reference to FIG. 6, the partial uplink resource measurement map (PRMM) 740 includes RSS measurement information measured by the source/transmitter station (Z) for at least some of the uplink resources specified in the RMIE 500, and the partial uplink resource measurement map (PRMM) 740 groups this RSS measurement information into different categories, which in one example, are high, middle and low measured RSS levels.

Stations can then transmit their respective RMRMs back to the base station. At a minimum, any station that is preparing to request an uplink resource allocation needs to send its RMRM. Thus, at step 1150, the source/transmitter station (Z) transmits the RMRM 700 to the base station to report its performance metrics (e.g., RSS measurements measured/determined by the source/transmitter station (Z)) to the base station via the PRMM 740. At a maximum, every station receiving the RMIE sends its RMRM to the base station. As will be described below with reference to FIG. 12, the base station can then use the PRMM 740 (along with other information including PRMMs from other stations) to help make uplink resource allocation decisions.

At step 1150, the source/transmitter station (Z) also transmits an initial uplink Resource Request Message (RRM) to the base station. The RRM indicates the type of communication session the source/transmitter station (Z) would like to set up with a destination/receiver station (B) including information regarding QoS requirements for that communication session. The Resource Request Message (RRM) can include information including: (1) the type of communication session the source/transmitter station (Z) would like to set up with a destination/receiver station (B) including information regarding QoS requirements for that communication session, (2) information regarding the station type, (3) information about the size of the packet to be transmitted by the source/transmitter station (Z), etc.

In one embodiment, the RRM also includes the RMRM 700 (and hence the PRMM 740). In another embodiment, the source/transmitter station (Z) transmits the RMRM 700 separately.

Figure 12:
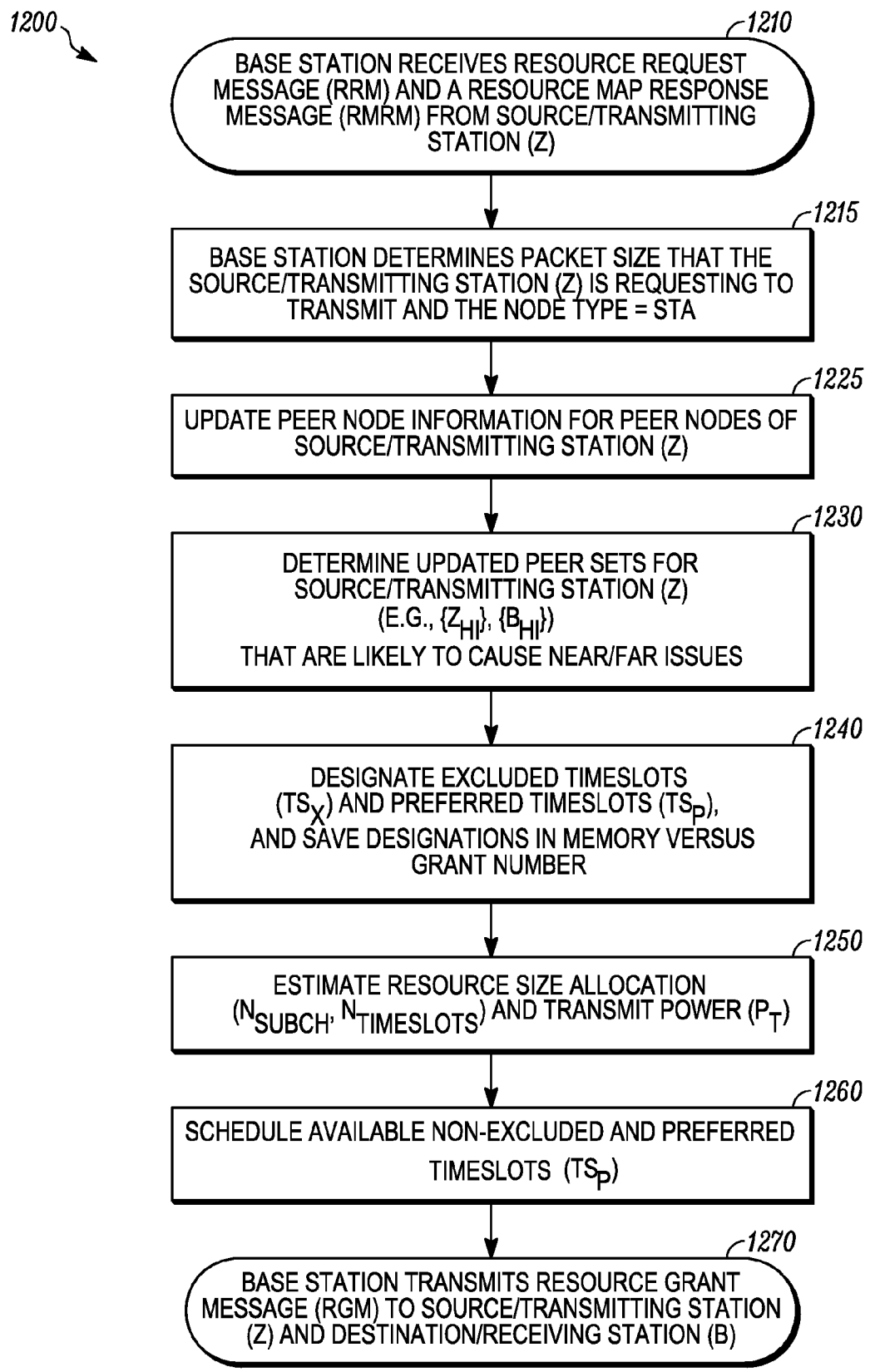
FIG. 12 is flow chart illustrating processing performed at a base station during a proactive scheduling method in accordance with some embodiments.

FIG. 12 is flow chart illustrating processing 1200 performed at a base station during a proactive scheduling method in accordance with some embodiments.

At step 1210, the base station receives the resource map response message (RMRM) 700 and the initial uplink Resource Request Message (RRM) from the source/transmitter station (Z), and saves this information in memory. Although not illustrated, the base station can also receive RMRMs from other stations. As will be described below, the base station eventually uses the RMRM received from the source/transmitter station (Z) (along with RMRMs from other stations) to schedule uplink resources allocated to the source/transmitter station (Z).

At step 1215, the base station can determine, based on the RMM, the packet size the source/transmitter station (Z) requests to transmit and/or the station type of the station that is requesting an uplink resource grant (i.e., the source/transmitter station (Z)), needed to determine the amount of resources to be allocated.

At step 1225, based on the partial resource measurement map (PRMM) 740 from the RMRM 700, the base station updates peer information for the source/transmitter station (Z) that is requesting the uplink resource grant. At this point in time, only information that station Z has sent in the recent RMRM is used to update Zs peer information. However, other stations that receive transmissions from Z may send back Zs resource allocation in their RMRM. Some embodiments may assume that wireless channels are reciprocal and update Zs peer information to include stations whose RMRMs contain Z. One embodiment of the peer information updating method will be described below with reference to FIG. 13.

Update of Peer Information

Figure 13:
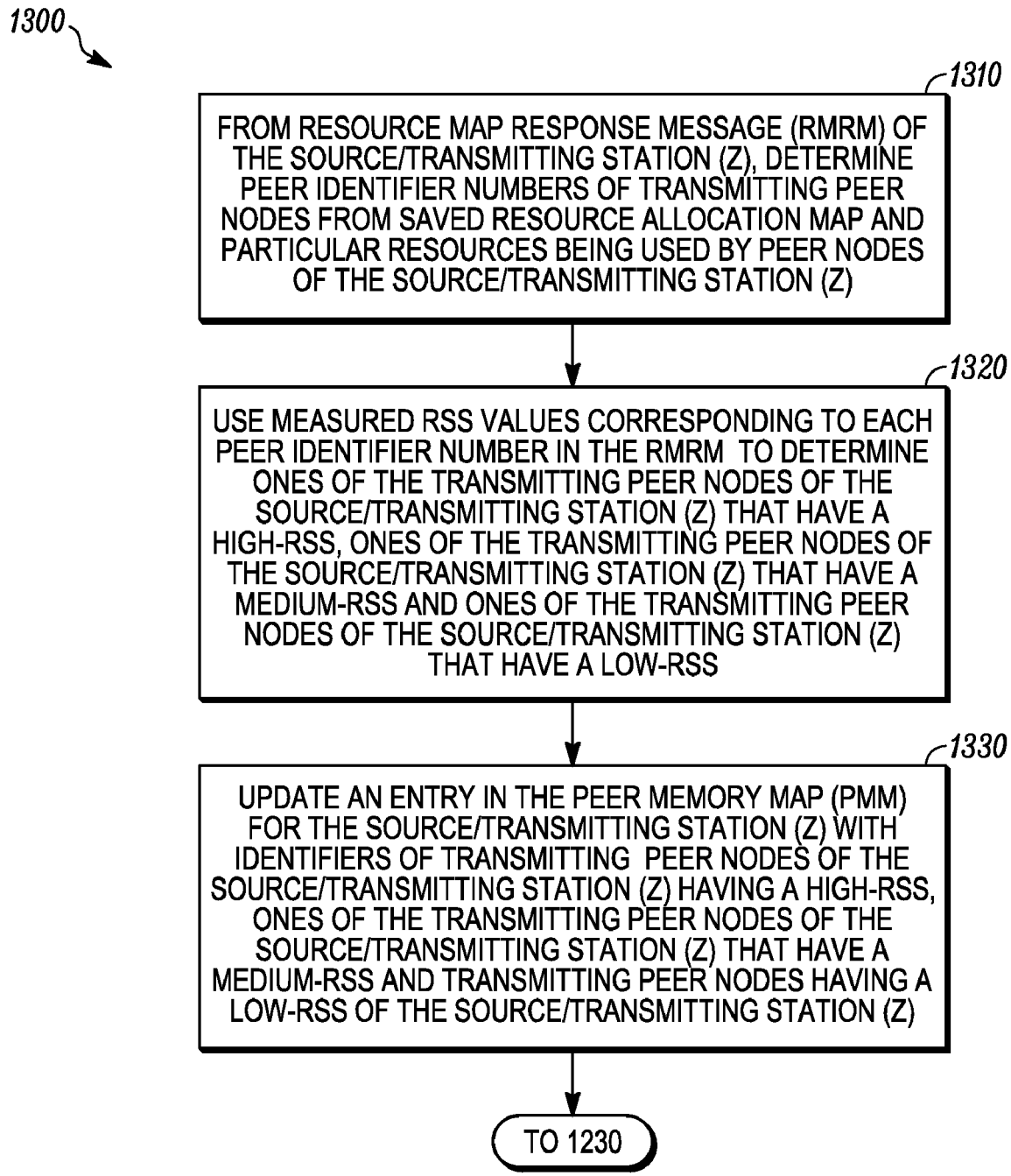
FIG. 13 is flow chart illustrating a method performed at a base station for updating peer information for a source/transmitter station (Z) that is requesting the uplink resource grant during a proactive scheduling method in accordance with some embodiments.

FIG. 13 is flow chart illustrating a method 1300 performed at a base station for updating peer information for a source/transmitter station (Z) that is requesting the uplink resource grant during a proactive scheduling method in accordance with some embodiments. As noted above, the source/transmitter station (Z) determines peer information by scanning over a PRAM 530 of the resource allocation map, and sends a RMRM 700 to the base station that includes the peer information in map coordinates. In the example that will be described below, source/transmitter station (Z) specifies resources in the resource allocation map where the interference levels are high and low. For instance, in this simplified example, the source/transmitter station (Z) has determined that it has high RSS peers at X1, X2 and X3, where X1, X2 and X3 are each locations in the resource map, and has determined that it has low RSS peers at Y1, Y2 and Y3, where Y1, Y2 and Y3 are other locations in the resource map. (X1 is sub-channel 1 and time slot 3). Thus, in the description that follows an example is described in which the source/transmitter station (Z) reports three peers $\{X_1, X_2, X_3\}$ with high measured RSS values ($Z_{HI\_meas}$) and three peers $\{Y_1, Y_2, Y_3\}$ with low measured RSS values ($Z_{LO\_meas}$), and zero peers with medium RSS values ($Z_{MED\_meas}$). As will now be described, in this embodiment, the base station extracts measured RSS information for each peer station from the partial resource measurement map (PRMM) 740 of the RMRM 700 that was received from the source/transmitter station (Z) to create an entry in a peer memory map (PMM) for station Z that is illustrated in row 1 of Table 5.

At step 1310, the base station translates or converts the resource information ($X_1, Y_1$, etc . . . ) from source/transmitter station (Z) (that was provided in the partial resource measurement map (PRMM) 740) into actual peer station identification numbers or "identifiers" ($x_1, y_1$, etc . . . ). Because the base station generated the resource allocation map, the base station knows which station was previously assigned to which resource (i.e., the base station know which resources were allocated to what stations). Hence, given the resource location (sub-channel/time-slot), the base station knows the station identification number that was allocated to transmit during the given resource. For example, when the base station receives resource allocation $X_1$ (for instance frequency sub-channel 1 and time slot 3 above) in a PRMM, the base knows that device x1 was previously assigned to transmit during this portion of the frame 400 using this resource allocation.

At step 1320, for each of the peer identifiers determined at step 1310, the base station evaluates the corresponding category MAP Data fields 748, 758, 768 from the PRMM 740, determines which peer station identification numbers correspond to particular entries in each of the category MAP Data fields 748, 758, 768, and determines the appropriate transmitter peer list for each peer station identification number. A base station may maintain multiple transmitter peer lists for high power RSS peers, medium power RSS powers and low power RSS peers. Low power RSS peers can be referred to as transmitting non-peers. For instance, in one simplified example, after completing step 1320 the base station has determined that source/transmitter station with identification number z has high RSS peer stations with identification numbers $x_1$, $x_2$ and $x_3$, low RSS peer stations with identification numbers $y_1$, $y_2$ and $y_3$, and no medium RSS peer stations.

At step 1330, the base station then creates or updates an entry in a Peer Memory Map (PMM) for source/transmitter station (Z). The PMM includes columns and rows, where each row corresponds to data for a particular station. In the example illustrated, the PMM includes three columns as follows: (1) one column that lists stations including the source/transmitting station (with identification number z) and every other station that can potentially engage in peer to peer communications, (2) another column that lists peer stations (of each station in the first column) having a high RSS and (3) another column that lists peer stations (of each station in the first column) having a low RSS. Although not illustrated, there can be another column that lists peer stations (of each station in the first column) having a medium RSS. An entry in the PMM is a row of data for a particular station that is identified in the first column.

One example of a PMM is illustrated in Table 5 below. In this simplified example, the Peer Memory Map (PMM) in Table 5 has entries for two stations: source/transmitter station (z) and the destination/receiver station (b). For destination/receiver station (b) the PMM includes a list of peer stations ($a_1$, $a_2$, $a_3$) having a high measured RSS and a list of peer stations ($w_1$, $w_2$, $w_3$) having a low measured RSS, where $a_1$, $a_2$ and $a_3$ and $w_1$, $w_2$, $w_3$ are peer station identification numbers. Similarly, for the source/transmitter station (z) the PMM includes a list of peer stations ($x_1$, $x_2$, $x_3$) having a high measured RSS and a list of peer stations ($y_1$, $y_2$, $y_3$) having a low measured RSS, where $x_1$, $x_2$ and $x_3$ and $y_1$, $y_2$, $y_3$ are peer station identification numbers. Although not illustrated in Table 5, the PMM includes one entry for each station that can potentially engage in peer to peer communication. After updating the source/transmitter station PMM entries for z and b in Table 5, the peers for z and b may also be updated. For example in Table 5 the PMM entries for stations ($x_1, x_2, x_3$) all can have station z listed as a high power peer and stations ($a_1$, $a_2$, $a_3$) can have station b listed as a high power peer. (Table 5 does not show the analogous low power peers for stations ($y_1$, $y_2$, $y_3$) and ($w_1$, $w_2$, $w_3$)).

TABLE 5

Peer Memory Map (PMM)

| Station | Peer Stations Having High Measured RSS | | | Peer Stations Having Low Measured RSS | | |
|---|---|---|---|---|---|---|
| source/transmitter station (z) | $x_1$ | $x_2$ | $x_3$ | $y_1$ | $y_2$ | $y_3$ |
| destination station (b) | $a_1$ | $a_2$ | $a_3$ | $w_1$ | $w_2$ | $w_3$ |
| . . . | | | | | | |
| STA ($x_1$) | z | . . . | . . . | . . . | . . . | . . . |
| STA ($x_2$) | z | . . . | . . . | . . . | . . . | . . . |

TABLE 5-continued

Peer Memory Map (PMM)

| Station | Peer Stations Having High Measured RSS | | | | | | Peer Stations Having Low Measured RSS | | | | | |
|---|---|---|---|---|---|---|---|---|---|---|---|---|
| STA ($x_3$) | z | ... | ... | ... | ... | ... | | | | | | |
| STA ($a_1$) | b | ... | ... | ... | ... | ... | | | | | | |
| STA ($a_2$) | b | ... | ... | ... | ... | ... | | | | | | |
| STA ($a_3$) | b | ... | ... | ... | ... | ... | | | | | | |
| ... | | | | | | | | | | | | |

Generation of Updated Peer Sets

High RSS peer stations cause the most interference for nearby receivers, and therefore it is desirable to isolate transmissions of high RSS peer stations in the time domain by scheduling transmission of the source/transmitter station (Z) so that they are received at a time when it's high RSS peer stations are not transmitting.

The base station receives PRMMs from each station that want to transmit peer-to-peer (or station-to-station) traffic. The base station combines the information from multiple PRMMs received from different stations to create or update peer sets. In the following description, different peer sets will be called high and low impact peer sets. For example, as illustrated at step 1230 of FIG. 12, the base station processes the partial resource measurement map (PRMM) 740 provided in the RMRM 700 along with other PRMMs provided in RMRMs from other stations to generate or update "high impact peer sets" of stations that have a high probability of causing near-far issues to each other and "low impact peer sets" that have a low probability of causing near-far issues to each other. As used herein, the term "high impact peer set" refers to information that identifies groups of stations that could potentially cause near-far issues if one station that belongs to the peer set transmits while another station that belongs to the peer set is attempting to receive a different transmission from another station that does not belong to the peer set. As used herein, the term "low impact peer set" refers to information that identifies groups of stations that are unlikely to cause near-far issues if one station that belongs to the peer set transmits while another station that belongs to the peer set is attempting to receive a different transmission from another station that does not belong to the peer set. It should be noted that interference within a time slot may be additive such that two or more medium impact peers can cause high impact.

For instance, in the example described above, the source/transmitter station (Z) has three high impact (high RSS) peer stations: $Z_{HI\_meas} = \{x_1, x_2, x_3\}$ and three low impact peer stations $Z_{LO\_meas} = \{y_1, y_2, y_3\}$. Similarly, the destination/receiver station (B) has three high impact peers: $B_{HI\_meas} = \{a_1, a_2, a_3\}$ and three low impact peers $B_{LO\_meas} = \{w_1, w_2, w_3\}$.

Marking Timeslots as Excluded or Preferred Based on Transmit and Receive Peer Sets Continuing with FIG. 12, at step 1240, after peer sets are updated, the base station determines which time slots are excluded ($TS_x$) and preferred ($TS_p$) based on the current station resource assignments in each time slot, the transmitter's peer sets in the base station PMM and the receiver's peer sets in the base station PMM, and then marks potential time slots in an uplink portion 450 of the resource allocation map maintained at the base station.

Figure 14:
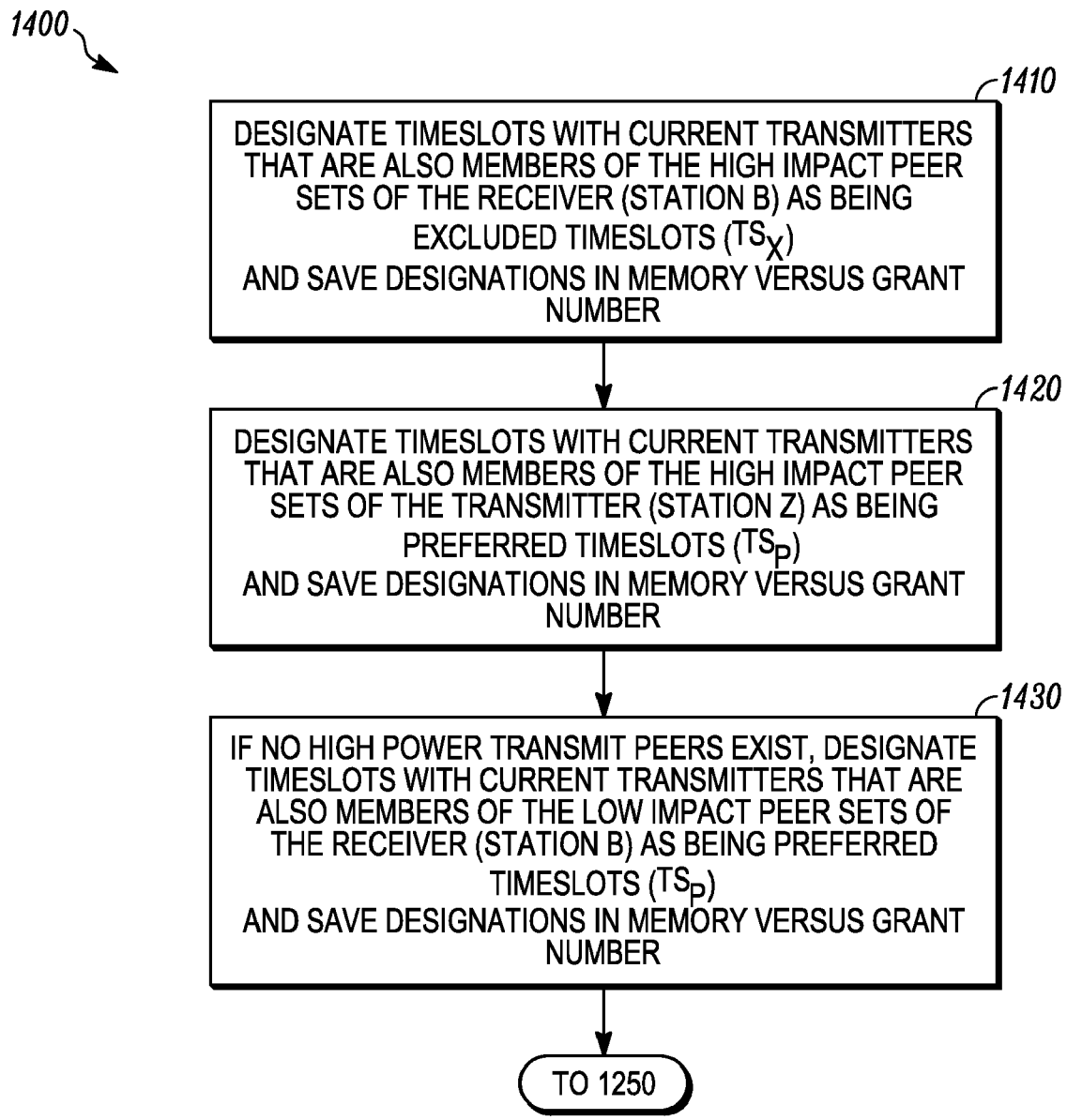
FIG. 14 is flow chart illustrating processing performed at a base station for determining which time slots of the resource allocation map are to be marked excluded time slots ($TS_x$) and preferred time slots ($TS_p$) during a proactive scheduling method in accordance with some embodiments.

FIG. 14 is flow chart illustrating processing 1400 performed at a base station for determining which time slots of the resource allocation map are to be marked excluded time slots ($TS_x$) and preferred time slots ($TS_p$) during a proactive scheduling method in accordance with some embodiments. The base station calculates excluded time slots ($TS_x$) and preferred time slots ($TS_p$) by comparing stations already in these time slots with peer sets of the source/transmitter (Z) and peer sets of the destination/receive station (B).

At step 1410, per Equation (1), the base station marks time slots that include peers $\{a_1, a_2, a_3\}$ in the high impact (high RSS) peer set ($B_{HI\_meas}$) of the destination/receiver station (B) as excluded time slots ($TS_x$):

$$TS_x = \{TS(i): i \in B_{HI\_meas}\} \quad \text{(Equation 1),}$$

where $\in$ denotes "belongs to" and $TS(i)$ represents the time slot in which transmission by station i has already been scheduled.

At step 1420, per Equation (2), the base station marks time slots that include peers $\{x_1, x_2, x_3\}$ in the high RSS peer set ($Z_{HI\_meas}$) of the source/transmitter station (Z) as preferred time slots ($TS_p$):

$$TS_p = \{TS(i): i \in Z_{HI\_meas}\} \quad \text{(Equation 2).}$$

At step 1430, per Equation (3), if there are no peers in the high RSS peer set ($Z_{HI\_meas}$) of the source/transmitter station (Z), then the base station marks time slots that include peers $\{w_1, w_2, w_3\}$ in the low impact (low RSS) peer set ($B_{LO\_meas}$) of the destination/receiver station (B) as preferred time slots ($TS_p$):

$$TS_p = \{TS(i): i \in B_{LO\_meas}\} \quad \text{(Equation 3).}$$

With intra-peer-set communications or in the presence of shadow fading, some time slots can be marked as being both an excluded time slot ($TS_x$) and preferred time slot ($TS_p$). Specifically, if j is a transmit station assigned to time slot $TS(j)$ such that: $j \in Z_{HI\_meas}$ and $j \in B_{HI\_meas}$, then $TS(j)$ will be marked as being both an excluded time slot ($TS_x$) and preferred time slot ($TS_p$).

This conflicting time slot status can be resolved based on whether the source/transmitter station (Z) is a member of the high impact peer set ($B_{HI\_meas}$) of the destination/receiver station (B) (i.e., $Z \in B_{HI\_meas}$) as indicated in Equation (4) below.

$$\text{If } Z \in B_{HI\_meas}, \text{ mark } (TS(j)) \text{ as preferred } (TS_p), \text{ else} \\ \text{mark } (TS(j)) \text{ as excluded } (TS_x) \quad \text{(Equation 4)}$$

If Z is a member of the high impact peer set ($B_{HI\_meas}$) of the destination/receiver station (B) (i.e., $Z \in B_{HI\_meas}$), then the time slot occupied by node j $TS(j)$ is marked as preferred. Otherwise, $TS(j)$ is marked as excluded.

In the former situation, the source/transmitter station (Z), the destination/receiver station (B), and transmit station (j) are all high-power peers of each other. The intra-peer set communication from the source/transmitter station (Z) to the destination/receiver station (B) is power controlled to use the minimum power needed to achieve the system's maximum modulation rate. The destination/receiver station (B) receives a high RSS level and can tolerate the presence of transmissions from transmit station (j) in the same vicinity. The latter situation can arise with shadow fading when the source/transmitter station (Z) is not a high-power peer of the destination/receiver station (B) but transmit station (j) is a high-power peer of the source/transmitter station (Z) and the destination/receiver station (B). This can happen, for example, if the source/transmitter station (Z) and the destination/receiver station (B) are in adjacent rooms separated by a wall and transmit station (j) is at the doorway connecting the two rooms.

At step 1250, the base station estimates the uplink resource allocation size (RAS) based on the channel quality, i.e., estimated SINR for the resources under consideration (which determines the modulation and coding scheme that can be used) and the packet size. Thus, different RASs may be needed in different sub-channels, for example due to different fading and interference conditions. The uplink resource allocation size (RAS) depends on the channel/interference conditions experienced by the destination/receiver station (B) on the particular sub-channel(s). Thus, the RAS may change depending on which sub-channel/sub-channel group is considered for allocation. That is, the RAS is not necessarily the same for all parts of the wideband channel.

Specifically, starting with the first preferred time slot ($TS_p$) and the first candidate set of sub-channels, the number of sub-channels required and the transmit power required are computed. If the number of sub-channels available in the first preferred time slot ($TS_p$) is inadequate, the next preferred time slot ($TS_p$) is considered and so on. Any preferences pertaining to horizontal and vertical striping can be applied.

At step 1260, the base station allocates one or more uplink resources to the source/transmitter station (Z). Each "resource" is a combination of a frequency sub-channel within a particular time slot of an OFDMA frame 400. The set of one or more uplink resources allocated to the source/transmitter station (Z) is a "resource allocation" that can be any combination of one or more preferred time slot ($TS_p$) and any combination of one or more subcarriers/sub-channels within the one or more preferred time slots ($TS_p$). In one embodiment, the right-most preferred time slot(s) ($TS_p$) in the UL portion 450 of the resource allocation map, which are also not marked as being excluded time slots ($TS_x$), are allocated to the source/transmitter station (Z).

After the base station allocates the uplink resources to the source/transmitter station (Z), at step 1270 the base station transmits a resource grant message (RGM) to the source/transmitter station (Z) to notify the source/transmitter station (Z) of the uplink resources allocated to it. The source/transmitter station (Z) may then use the allocated uplink resources specified in the RGM for transmissions to the destination/receiver station (B).

Reactive Scheduling Methods for Potential Reallocation of Uplink Resources Based on QoS Performance Metrics for a Communication Session In the proactive method, uplink resources are allocated to the source/transmitter station (Z). In some scenarios, after a communication session or call is in progress, the uplink resource allocations provided via the proactive scheduling method can become inadequate and near-far issues can occur for the destination/receiver station (B). In such cases, the destination/receiver station (B) should request a new uplink resource allocation (or "re-allocation") to reduce and/or eliminate such near-far issues. For instance, in one implementation, a resource grant is terminated, renewed or reallocated at regular intervals (e.g., approximately every 2 seconds).

Reactive scheduling methods will now be described that can be used to address such scenarios. The reactive scheduling methods describe actions performed by a base station and a station after a communication session or call is in progress. The reactive scheduling methods allow for potential re-allocation of long-term uplink resources based on QoS performance metrics. These reactive scheduling methods allow the destination/receiver station (B) to recover from scenarios in which the proactive scheduling methods fail for some reason (e.g., station mobility or poor RSS measurements). In such embodiments, a reactive uplink resource allocation method is provided in which the base station re-schedules uplink communication resources and possibly changes the amount of information stations collect.

Figure 15:
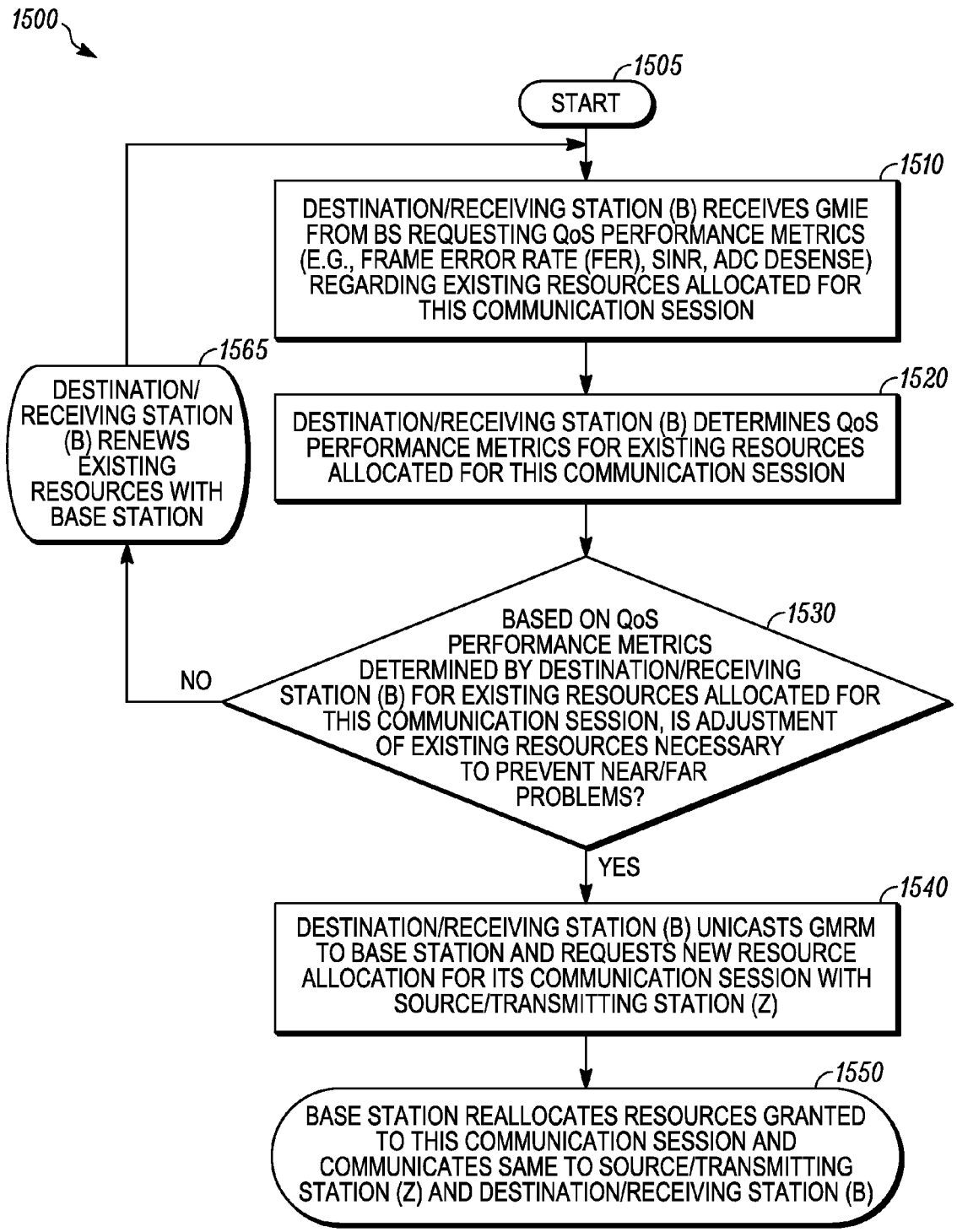
FIG. 15 is a flowchart illustrating a reactive scheduling method in accordance with some embodiments.

FIG. 15 is a flowchart illustrating a reactive scheduling method 1500 in accordance with some embodiments. In this example, the source/transmitter station (Z) is involved in a communication session or call with the destination/receiver station (B) using resources granted or allocated to it by the base station as part of a proactive scheduling method. In the description that follows, these currently granted resources being used in the active communication session will be referred to below as "existing" resources.

The reactive scheduling method 1500 starts at step 1505 when destination/receiver station (B) begins a new peer-to-peer (or station-to-station) communication session with the source/transmitter station (Z). At step 1510, the destination/receiver station (B) receives a Grant Metric Information Element (GMIE) 600 generated and broadcast by the base station. As described above, the GMIE 600 informs stations of the type and amount of QoS information the destination/receiver stations (B) are to provide to the base station via a Grant Metric Response Message (GMRM) 800.

At step 1520, the destination/receiver station (B) decodes the GMIE 600, determines QoS performance metrics (e.g., frame error rate (FER), SINR, ADC desense) being requested by the base station for existing uplink resources allocated to this communication session, and determines (measures and/or calculates) those QoS performance metrics for the existing uplink resources allocated to this communication session that it is using to communicate with the source/transmitter station (Z).

At step 1530, the destination/receiver station (B) can determine, based on these QoS performance metrics, whether to continue with its existing uplink resource allocation for this communication session, or whether to request a new uplink resource allocation for this communication session. For example, the destination/receiver station (B) determines, based on the QoS performance metrics (e.g., frame error rate (FER), SINR, ADC desense) that it has measured/calculated for existing uplink resources allocated to this communication session, whether to continue using existing uplink resource allocation or whether to request an adjustment or "reallocation" of the existing uplink resources is necessary to prevent near/far problems.

When the destination/receiver station (B) determines, based on the measured/calculated QoS performance metrics for existing uplink resources allocated to this communication session, that continued use of its existing uplink resources is likely to cause near/far problems, the method 1500 proceeds to step 1540, where the destination/receiver station (B) unicasts a GMRM to the base station along with a request for a new uplink resource allocation for this communication session with the source/transmitter station (Z). At step 1550, in response to the request for a new uplink resource allocation, the base station determines a new uplink resource allocation and communicates this information to the destination/receiver station (B) and the source/transmitter station (Z).

By contrast, when the destination/receiver station (B) determines that it would like to continue using existing uplink resource allocation for its communication session with the source/transmitter station (Z), the method 1500 proceeds to step 1565, where the destination/receiver station (B) renews the allocation of its existing resources by transmitting a resource renewal request message (RRRM) to the base station.

A specific implementation of the reactive scheduling method will now be described with reference to FIGS. 16-18.

Figure 16:
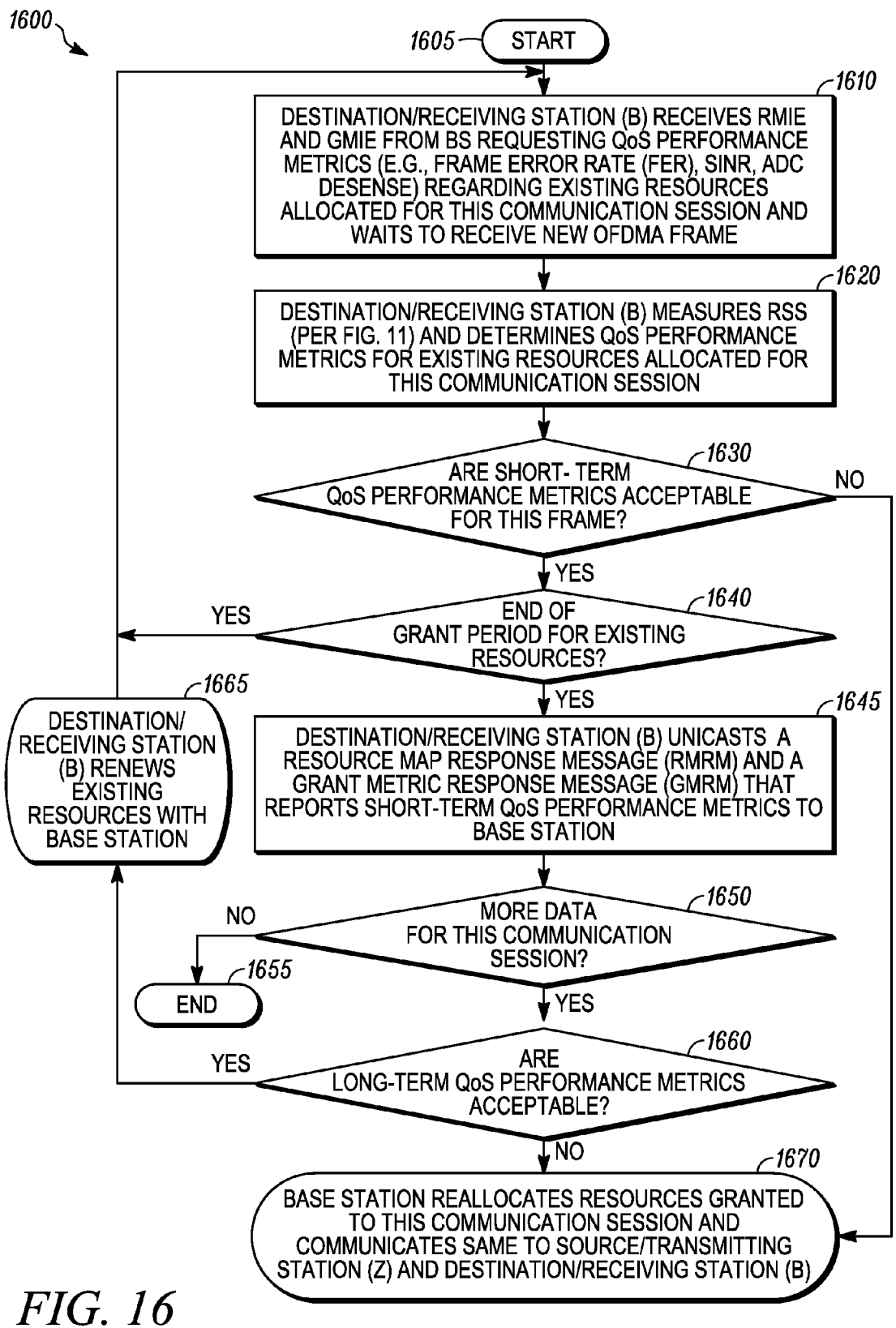
FIG. 16 is a flowchart illustrating processing performed by a destination/receiver station (B) performs to determine whether to request a new uplink resource allocation during a reactive scheduling method in accordance with some embodiments.
Figure 17:
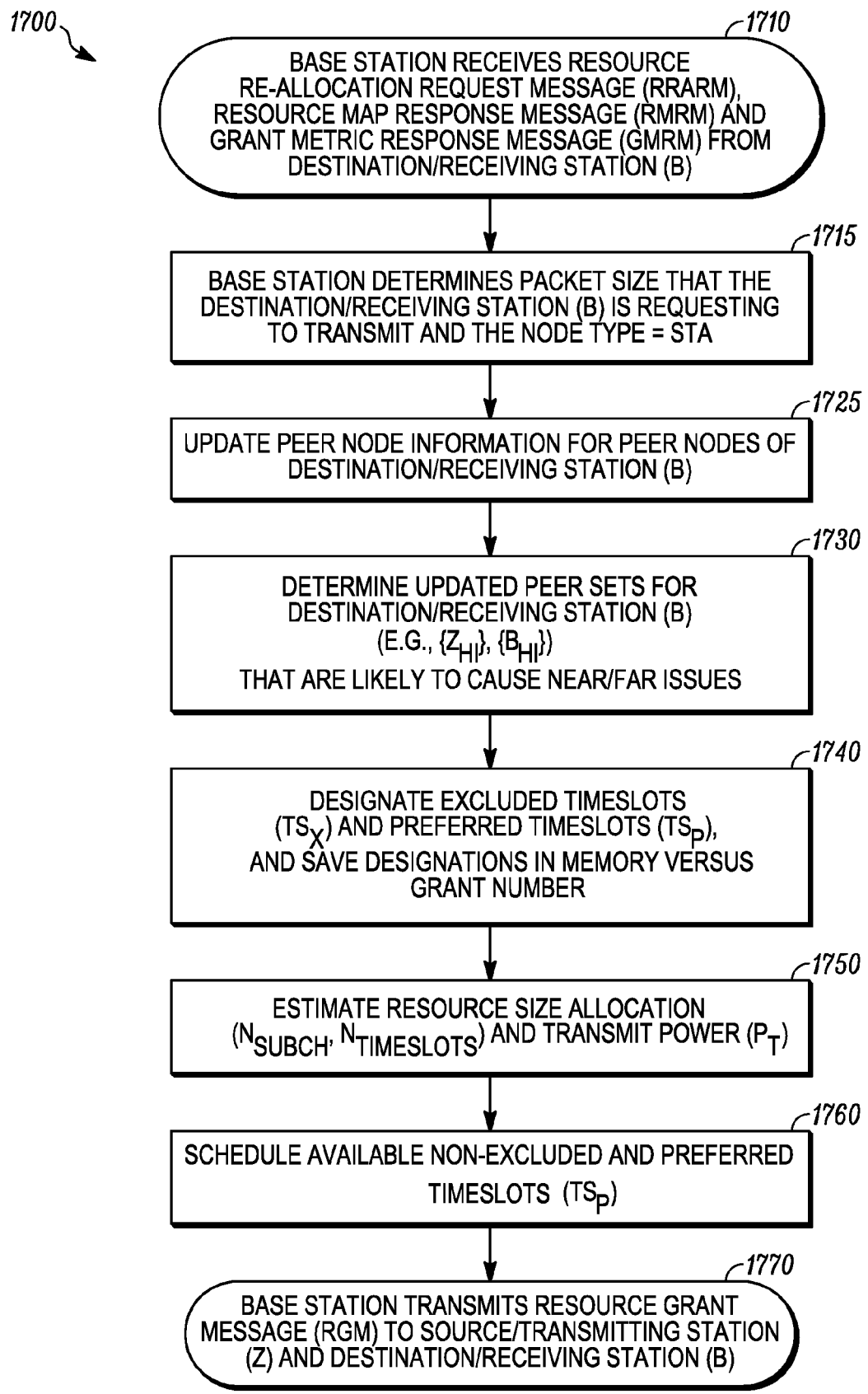
FIG. 17 is flow chart illustrating processing performed at a base station during a reactive scheduling method in accordance with some embodiments.
Figure 18:
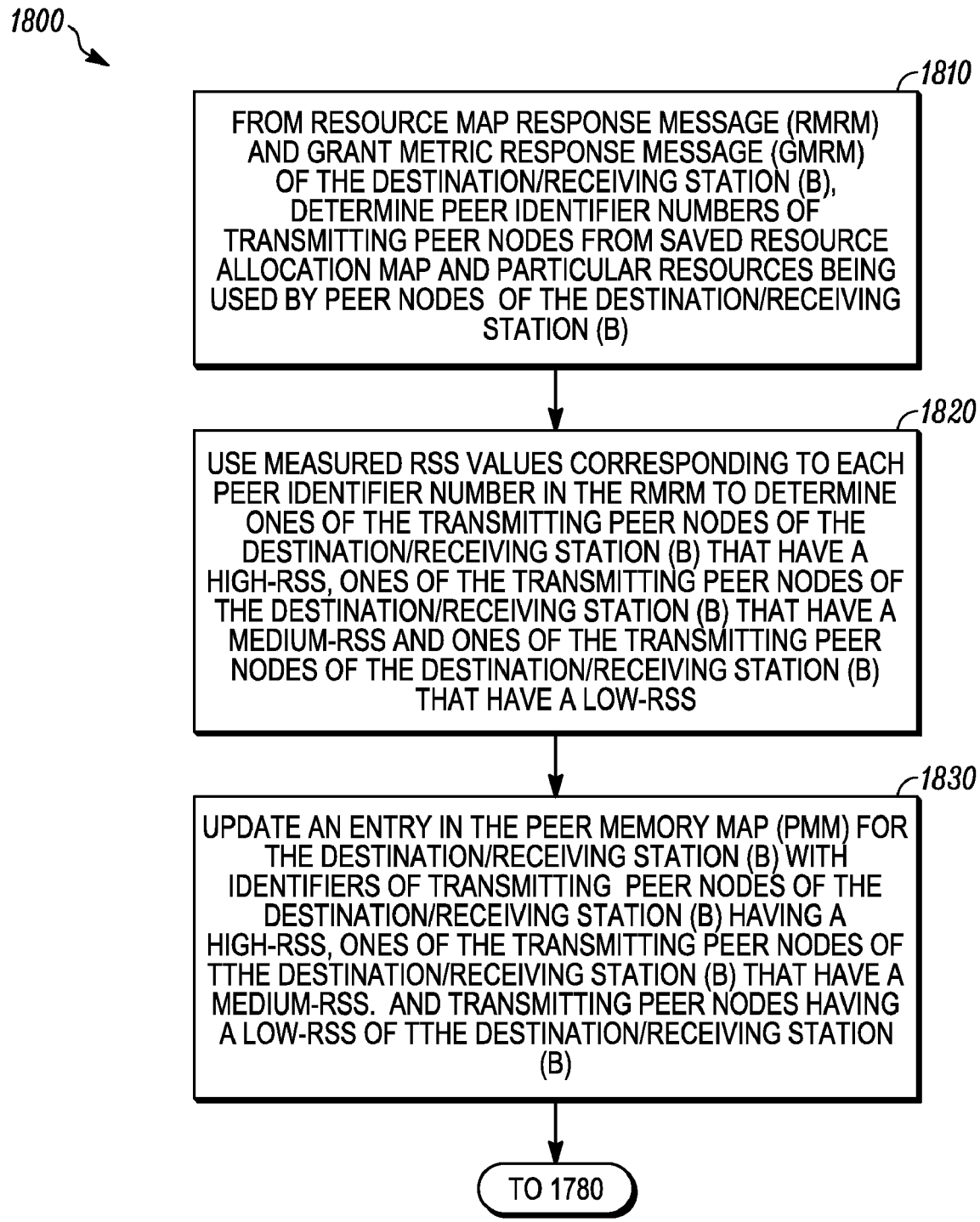
FIG. 18 is flow chart illustrating a method performed at a base station for updating peer information for the destination/receiver station (B) that is requesting the uplink resource re-allocation during the reactive scheduling method in accordance with some embodiments.

FIGS. 16-18 describe an embodiment of the reactive scheduler that can use short term QoS metrics and/or long term QoS metrics provided by the destination/receiver station (B) to create rules for rescheduling uplink resource allocations to avoid causing near-far issues. The base station can then allocate new uplink resources to the source/transmitter station (Z) and the destination/receiver station (B) for continuing their communication session. This way, the base station can improve a new uplink resource allocation to the source/transmitter station (Z) and the destination/receiver station (B) since the base station bases this new uplink resource allocation on feedback provided by the destination/receiver station (B) at the time of the uplink resource request.

FIG. 16 is a flowchart illustrating processing 1600 performed by a destination/receiver station (B) performs to determine whether to request a new uplink resource allocation during a reactive scheduling method in accordance with some embodiments.

While participating in an active communication session or call with the source/transmitter station (Z) over an existing resource allocation, the destination/receiver station (B) actively monitors the OFDMA channel. For each OFDMA frame 400 received, the destination/receiver station (B) determines information the base station has requested via a RMIE 500 and a GMIE 600. As described below, the destination/receiver station (B) can measure any number of QoS performance metrics with respect to the existing resources that reflect quality of the communication link between the source/transmitter station (Z) and the destination/receiver station (B), and then use these QoS performance metrics to monitor adequacy of the current uplink resource allocation.

The reactive scheduling method 1600 starts at step 1605, when destination/receiver station (B) begins a new communication session with the source/transmitter station (Z). At step 1610, the destination/receiver station (B) receives a Resource Map Information Element (RMIE) 500 and a Grant Metric Information Element (GMIE) 600 generated and broadcast by the base station. The RMIE and GMIE may be independent broadcast signals or may be embedded in the control time slots at the beginning of an OFDMA frame 400. The RMIE directs the destination/receiver station (B) to collect information about its local environment. If the current resource allocation that is being used for the communication session begins performing poorly from a QoS perspective, it is desirable for the base station to have up-to-date RSS measurement information to use in making a new resource allocation. The destination/receiver station (B) can send an RMRM to the base station to provide this up-to-date RSS measurement information.

At step 1620, the destination/receiver station (B) decodes the RMIE 500 and implements methods similar to those described above with respect to FIG. 11 to measure RSS over a PRMM 740. The destination/receiver station (B) also decodes the GMIE 600, determines QoS performance metrics (e.g., frame error rate (FER), SINR, ADC desense) being requested by the base station for existing uplink resources allocated to this communication session, and determines (measures and/or calculates) "short-term" QoS performance metrics for the existing uplink resources allocated to this communication session that it is using to communicate with the source/transmitter station (Z). Short-term QoS performance metrics are QoS performance metrics that are determined (measured/calculated) over the current OFDMA frame 400.

At step 1630, the destination/receiver station (B) can determine whether the short-term QoS performance metrics are acceptable for the current OFDMA frame 400.

If the short-term QoS performance metrics are not acceptable for the current OFDMA frame 400, the method 1600 proceeds to step 1670, where the destination/receiver station (B) can send a GMRM to the base station that reports the short-term QoS performance metrics that were determined at step 1620, a RMRM and an uplink resource re-allocation request message (RRARM) to request new uplink resource allocation for the communication session between the source/transmitter station (Z) and the destination/receiver station (B). Although not illustrated in FIG. 16, in one embodiment, the destination/receiver station (B) can abort the existing resources before the resource period ends if a short-term QoS metric (e.g. frame error rate (FER)) exceeds a threshold and send the base station a RMRM identifying alternative resource allocation information and a GMRM that identifies the QoS performance metric that caused the resource abort.

If the short-term QoS performance metrics are acceptable for the current OFDMA frame 400, the method 1600 proceeds to step 1640, where the destination/receiver station (B) can determine if the grant period for the existing resources has expired. Grant periods can be a function of traffic type, channel reliability, traffic intensity and base station loading. Grant periods may also be values specified by standard bodies for certain types of traffic. If the grant period for the existing resources has not yet expired, then the method 1600 loops back to step 1610, where the destination/receiver station (B) can continue to monitor short-term QoS performance metrics until the grant period for the existing resources expires.

If the grant period for the existing resources has expired, then the method 1600 can proceed to step 1645, where the destination/receiver station (B) can send a RMRM 700 and a GMRM 800 to the base station that reports the short-term QoS performance metrics for this OFDMA frame 400, and the method 1600 proceeds to step 1650 where the destination/receiver station (B) can determine whether there is more data for this communication session (or call).

If the destination/receiver station (B) determines that there is no more data for this communication session (or call), then the method 1600 ends at step 1655.

If the destination/receiver station (B) determines that there is more data for this communication session (or call), then the method 1600 proceeds to step 1660, where the destination/receiver station (B) can determine whether the long-term QoS performance metrics are acceptable. This way the destination/receiver station (B) can determine whether it wants to continue using its existing uplink resource allocation for this communication session, or whether to request a new uplink resource allocation for this communication session (i.e., an adjustment or "reallocation" of the existing uplink resources is necessary to prevent near/far problems).

The long-term QoS performance metrics are determined by processing QoS measurements. For instance, one embodiment estimates long-term QoS metrics as the running average of the short-term QoS performance metrics (determined for each frame) from the start of a grant period up to the current point in time. The destination/receiver station (B) compares the long-term metrics over the grant period with thresholds to determine whether or not a re-association request should be made. In one embodiment, the FER threshold for triggering re-association request from a destination/receiver station (B) depends on the type of traffic being communicated since different traffic types require different quality of service (QoS) and therefore need different re-association thresholds. For example, best effort data can tolerate fairly high FER, while real time traffic is more sensitive to interference. When the QoS Traffic Type is known, the table below provides re-associating trigger points according to one implementation.

TABLE 6

Re-association Trigger Points

| QoS/<br>Traffic Type | FER<br>Trigger Level |
|---|---|
| Best Effort Data | 20% |
| Voice | 5% |
| Video | 3% |

When the ADC desense exceeds a predefined tolerance limit, RSS levels for all uplink resources causing ADC desense to the receiver's desired grant can be returned in the RMRM when a destination/receiver station (B) requests re-association.

If the long-term QoS performance metrics are acceptable, the method 1600 proceeds to step 1665, where the destination/receiver station (B) can renew the allocation of its existing resources by transmitting a resource renewal request message (RRRM) to the base station. In other words, the destination/receiver station (B) can request renewal of its current uplink resource allocations so that it can continue using existing uplink resource allocation for its communication session with the source/transmitter station (Z).

If the long-term QoS performance metrics for existing uplink resources (allocated to this communication session) are not acceptable (e.g., that continued use of its existing uplink resources is likely to cause near/far problems), the method 1600 proceeds to step 1670, where the destination/receiver station (B) can unicast a GMRM to the base station that reports the long-term QoS performance metrics (as computed above), a RMRM, and an uplink resource re-allocation request message (RRARM) to request new uplink resource allocation for its communication session with the source/transmitter station (Z). In response to the uplink resource re-allocation request message, the base station can determine new uplink resources to allocate for the communication session between the source/transmitter station (Z) and the destination/receiver station (B).

FIG. 17 is flow chart illustrating processing 1700 performed at a base station during a reactive scheduling method in accordance with some embodiments.

At step 1710, the base station receives the resource map response message (RMRM) 700, a grant metric response message (GMRM) 800 and the uplink Resource Re-allocation Request Message (RRARM) from the destination/receiver station (B), and saves this information in memory. Although not illustrated, the base station can also receive RMRMs and GMRMs from other stations. As will be described below, the base station eventually uses the RMRM and the GMRM received from the destination/receiver station (B) (along with RMRMs and GMRMs from other stations) to schedule uplink resources allocated for the communication session between the source/transmitter station (Z) and the destination/receiver station (B).

At step 1715, the base station can determine, based on the RRARM, the packet size the destination/receiver station (B) requests to transmit and/or the station type of the station that is requesting an uplink resource re-allocation (i.e., the destination/receiver station (B)). The packet size can be used to determine the amount of resources to be allocated (e.g. number of frequency sub-channels and number of time slots).

At step 1725, based on the partial resource measurement map (PRMM) 740 from the RMRM 700, the base station updates peer information for the destination/receiver station (B) that is requesting the uplink resource re-allocation. Moreover, in some embodiments other RMRM information can be used to update the source/transmitter station's (Z) peer sets. In addition, timeouts may be used for each individual peer to allow past PRMM 740 measurements to reside in the peer set memory for a period of time. The reactive scheduling method uses techniques similar to those used in the proactive scheduling method to improve peer sets. One embodiment of the peer information updating method will be described below with reference to FIG. 18.

Update of Peer Information

FIG. 18 is flow chart illustrating a method 1800 performed at a base station for updating peer information for the destination/receiver station (B) that is requesting the uplink resource re-allocation during the reactive scheduling method in accordance with some embodiments. As noted above, the destination/receiver station (B) determines peer information by scanning over a PRAM 530 of the resource allocation map, and sends a RMRM 700 to the base station that includes the peer information in map coordinates. In the example that will be described below, destination/receiver station (B) specifies resources in the resource allocation map where it determines high level RSS, medium level RSS and low level RSS. For instance, in this simplified example, the destination/receiver station (B) has determined that it has high RSS peers at A1, A2 and A3, where A1, A2 and A3 are each locations in the resource map, and has determined that it has low RSS peers at W1, W2 and W3, where W1, W2 and W3 are other locations in the resource map. (W1 is sub-channel 1 and time slot 3). Thus, in the description that follows an example is described in which the destination/receiver station (B) reports three peers with identification numbers $\{a_1, a_2, a_3\}$ with high measured RSS values ($B_{HI\_meas}$) and three peers with identification numbers $\{w_1, w_2, w_3\}$ with low measured RSS values ($B_{LO\_meas}$), and zero peers with medium RSS values ($B_{MED\_meas}$). As will now be described, in this embodiment, the base station extracts measured RSS information for each peer station from the partial resource measurement map (PRMM) 740 of the RMRM 700 that was received from the destination/receiver station (B) to create or update an entry in a peer memory map (PMM) for destination/receiver station (B) that is illustrated in row 2 of Table 7.

At step 1810, the base station translates or converts the resource information ($A_1$, $W_1$, etc . . . ) from destination/receiver station (B) (that was provided in the partial resource measurement map (PRMM) 740) into actual peer station identification numbers or "identifiers" ($a_1$, $w_1$, etc . . . ). Because the base station generated the resource allocation map, the base station knows which station was previously assigned to which resource (i.e., the base station know which resources were allocated to what stations). Hence, given the resource location (sub-channel/time-slot), the base station knows the station identification number that was allocated to transmit during the given resource. For example, when the base station receives resource allocation $A_1$ in a PRMM, the base station knows that device $a_1$ was previously assigned to resource allocation $A_1$ (frequency sub-channel 1 and time slot 3 above).

At step 1820, for each of the peer identifiers determined at step 1810, the base station evaluates the corresponding category MAP data fields 748, 758, 768 from the PRMM 740, determines which peer station identification numbers correspond to particular entries in each of the category MAP data fields 748, 758, 768, and determines the appropriate transmitter peer list for each peer station identifier. A base station may maintain multiple transmitter peer lists for high power RSS peers, medium power RSS powers and low power RSS peers. Low power RSS peers can be referred to as transmitting non-peers. For instance, in one simplified example, after completing step 1820 the base station has determined that destination/receiver station (B) with identification number b has high RSS peer stations with identification numbers $a_1$, $a_2$ and $a_3$ and low RSS peer stations with identification numbers $w_1$, $w_2$ and $w_3$, and no medium RSS peer stations.

At step 1830, the base station then creates or updates an entry in a Peer Memory Map (PMM) for destination/receiver station (B). The PMM includes columns and rows. In the example illustrated in Table 7 (below), the PMM includes three columns as follows: (1) a column that lists stations including the source/transmitting station (Z) with identification number z and all other stations that can potentially engage in peer to peer communication, (2) another column that lists peer stations (of each station in the first column) having a high RSS and (3) another column that lists peer stations (of each station in the first column) having a low RSS. Although not illustrated, there can be additional columns that list peer stations (of each station in the first column) having a medium RSS. An entry is a row of data for a corresponding station in column 1.

One example of a PMM is illustrated in Table 7 below. In this simplified example, the Peer Memory Map (PMM) in Table 7 has entries for two stations: source/transmitter station (Z) and the destination/receiver station (B). For destination/receiver station (B) the PMM includes a list of peer stations ($a_1$, $a_2$, $a_3$) having a high measured RSS and a list of peer stations ($w_1$, $w_2$, $w_3$) having a low measured RSS. Similarly, for the source/transmitting station (Z) the PMM includes a list of peer stations ($x_1$, $x_2$, $x_3$) having a high measured RSS and a list of peer stations ($y_1$, $y_2$, $y_3$) having a low measured RSS. Although not illustrated, the PMM can also include one entry for each station that can potentially engage in peer to peer communication. After updating the source transmitter station PMM entries for z and b in Table 7, in some embodiments the peers for z and b may also be updated. For example in Table 7 the PMM entries for stations ($x_1$, $x_2$, $x_3$) all can have source/transmitter z listed as a high power peer and stations ($a_1$, $a_2$, $a_3$) can have destination/receiver station b listed as a high power peer, wherein $x_1$, $x_2$, $x_3$ and $a_1$, $a_2$, $a_3$ are peer station identification numbers. (Table 7 does not show the analogous low power peers for stations ($y_1$, $y_2$, $y_3$) and ($w_1$, $w_2$, $w_3$)).

TABLE 7

\Peer Memory Map (PMM)

| Station | Peer Stations Having High Measured RSS | | | Peer Stations Having Low Measured RSS | | |
|---|---|---|---|---|---|---|
| source/transmitter station (z) | $x_1$ | $x_2$ | $x_3$ | $y_1$ | $y_2$ | $y_3$ |
| destination station (b) | $a_1$ | $a_2$ | $a_3$ | $w_1$ | $w_2$ | $w_3$ |
| ... | | | | | | |
| STA ($x_1$) | z | ... | ... | ... | ... | ... |
| STA ($x_2$) | z | ... | ... | ... | ... | ... |
| STA ($x_3$) | z | ... | ... | ... | ... | ... |
| STA ($a_1$) | b | ... | ... | ... | ... | ... |
| STA ($a_2$) | b | ... | ... | ... | ... | ... |
| STA ($a_3$) | b | ... | ... | ... | ... | ... |
| ... | | | | | | |

Generation of Updated Peer Sets

High RSS peer stations cause the most interference for nearby receivers, and therefore it is desirable to isolate transmissions of high RSS peer stations in the time domain by scheduling transmission of the destination/receiver station (B) so that they are received at a time when it's high RSS peer stations are not transmitting.

The base station receives PRMMs from each station that want to transmit peer-to-peer (or station-to-station) traffic. Referring again to FIG. 17, as illustrated at step 1730, the base station processes the partial resource measurement map (PRMM) 740 provided in the RMRM 700 along with other PRMMs provided in RMRMs from other stations to generate or update "peer sets" of stations that have a high probability of causing near-far issues to each other. In other words, the base station combines the information from multiple PRMMs received from different stations to create or update peer sets.

In an alternative embodiment, the base station could use other information to generate updated peer sets. For instance, the base station could use QoS information about an ongoing communication session provided in the grant metric response messages (GMRM) 800 to improve peer sets. For example, if the receiver reports a medium RSS from another station that is occurring during its call (via PRMM) and also reports a poor QoS measurement for that call (via the GMRM), then the base station could decide to bump up the medium RSS interferer to a high category (High RSS) based on the impact it is having on the receiver call.

Marking Timeslots as Excluded or Preferred Based on Transmit and Receive Peer Sets Continuing with FIG. 17, at step 1740, after peer sets are updated, the base station determines which time slots are excluded ($TS_x$) and preferred ($TS_p$) based on the current station resource assignments in each time slot, the peer set entry of the transmitter in the base station PMM and the peer set entry of the receiver in the base station PMM, and then marks potential time slots in an uplink portion 450 of the resource allocation map maintained at the base station.

Although not illustrated, the base station can then perform processing during the reactive scheduling method that is similar to that described above with respect to FIG. 14 to determine which time slots of the resource allocation map are to be marked excluded time slots ($TS_x$) and preferred time slots ($TS_p$) in accordance with some embodiments. The base station calculates excluded time slots ($TS_x$) and preferred time slots ($TS_p$) by comparing stations already in these time slots with transmit peer set and receive peer set.

At step 1750, the base station estimates the uplink resource allocation size (RAS). Specifically, starting with the first preferred time slot ($TS_p$) and the first candidate set of sub-channels, the number of sub-channels required and the transmit power required are computed. If the number of sub-channels available in the first preferred time slot ($TS_p$) is inadequate, the next preferred time slot ($TS_p$) is considered and so on. Any preferences pertaining to horizontal and vertical striping can be applied.

At step 1760, the base station re-allocates one or more uplink resources to the destination/receiver station (B), where the one or more uplink resources re-allocated to the destination/receiver station (B) is a "resource allocation" that can be any combination of one or more preferred time slot (TSP) and any combination of one or more subcarriers/sub-channels within the one or more preferred time slots ($TS_p$). In one embodiment, the right-most preferred time slot(s) ($TS_p$) in the UL portion 450 of the resource allocation map, which are also not marked as being excluded time slots ($TS_x$), are allocated to the destination/receiver station (B).

After the base station re-allocates the uplink resources to the destination/receiver station (B), at step 1770 the base station transmits a resource grant message (RGM) to the destination/receiver station (B) and the source/transmitter station (Z) to notify them of the uplink resources re-allocated to them. The source/transmitter station (Z) may then use the allocated uplink resources specified in the RGM for transmissions to the destination/receiver station (B).

CONCLUSION

Traditional OFDMA scheduling solutions for avoiding near-far problems are base-station centric and do not support peer-to-peer traffic. The disclosed embodiments enable broadband OFDMA peer-to-peer communication networks and mesh mobility by using the MAC layer to avoid scheduling stations that would experience near-far issues in the same time allocation. The disclosed embodiments provide a signaling protocol with which the base station can request peer information from stations and the stations can appropriately respond to this request. This signaling protocol allows for both proactive and reactive collection of information. The disclosed embodiments also provide a seamless mechanism for transition between a conventional uplink/downlink scheduler and a scheduler that accommodates significant peer-to-peer traffic. As traffic changes from BS-station to peer-to-peer, the base station can adjust the RMIE and/or GMIE to adjust the amount of information collected by the stations and sent to the base station for creation of the peer sets needed to prevent near-far scheduling issues.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for scheduling Orthogonal Frequency-Division Multiple Access (OFDMA) resources allocated to a transmitter station for a peer-to-peer communication session with a receiver station, the method comprising:
    maintaining, at a base station, a resource allocation map comprising: particular OFDMA resources of an OFDMA frame that have been allocated to particular stations; and
    generating, at the base station, a request for information with respect to selected OFDMA resources;
    transmitting, from the base station to recipient stations including the transmitter station the request for the information with respect to the selected OFDMA resources;

receiving, at the base station, a first resource request message (RRM) from the transmitter station to request allocation of some of the OFDMA resources for the peer-to-peer communication session with the receiver station and the information with respect to some of the selected OFDMA resources from the recipient stations including the transmitter station, wherein the received information with respect to some of the selected OFDMA resources is categorized on the basis of potential to cause near-far interference;

processing, at the base station, the received information and the first RRM to determine specific ones of the some of the OFDMA resources to be allocated to the transmitter station for the peer-to-peer communication session with the receiver station, wherein the processing comprises classifying peer stations of the recipient stations including the transmitter station on the basis of their potential to cause the near-far interference to determine an updated peer station information for the recipient stations including the transmitter station; and using the updated peer station information to determine the specific ones of the some of the OFDMA resources to be allocated to the transmitter station; and allocating the specific ones of the some of the OFDMA resources to the transmitter station for the peer-to-peer communication session with the receiver station.

2. A method according to claim 1, wherein each of the OFDMA resources is an OFDMA frequency sub-channel within an OFDMA time slot, and wherein the request for information with respect to selected OFDMA resources comprises:

a resource map information element (RMIE), wherein the RMIE comprises: a Partial Resource Allocation Map (PRAM), comprising: selected OFDMA resources of the OFDMA frame that the base station is requesting more information about; an indicator that a radio frequency (RF) quality metric is to be measured with respect to the selected OFDMA resources; a number of first metric measurements being requested with respect to the selected OFDMA resources; and a first metric categories field which identifies one or more first metric categories a station is to report with respect to the selected OFDMA resources, and further comprising:

broadcasting the RMIE, from the base station to recipient stations including the transmitter station, to request first metric measurement information from the recipient stations based on information specified in the PRAM;

receiving, at the recipient stations including the transmitter station, the RMIE, and measuring first metric with respect to some of the selected OFDMA resources specified in the PRAM;

generating, at the recipient stations including the transmitter station, a resource map response message (RMRM) comprising information regarding first metric measurement with respect to some of the selected OFDMA resources, wherein the RMRM generated by the transmitter station comprises a first RMRM;

transmitting, to the base station, the respective RMRMs generated by each of the recipient stations including the first RMRM generated by the transmitter station, and the first resource request message (RRM) from the transmitter station to request allocation of some of the OFDMA resources for the peer-to-peer communication session with the receiver station.

3. A method according to claim 2, wherein the specific ones of the OFDMA resources allocated to the transmitter station each comprise: an allocated OFDMA sub-channel within a particular OFDMA time slot, and wherein the specific ones of the OFDMA resources are allocated such that other stations communicating over different OFDMA sub-channels of the particular OFDMA time slots will not cause near-far problems for the receiver station, and communications by the transmitter station using the specific ones of the OFDMA resources will not cause near-far problems for the other stations communicating over different OFDMA sub-channels of the particular OFDMA time slots.

4. A method according to claim 1, wherein the peer-to-peer communication session between the transmitter station and the receiver station takes place in an OFDMA cell defined by the base station, and further comprising:

dynamically adjusting resource measurement information of an RMIE at the base station as traffic characteristics change within the OFDMA cell.

5. A method according to claim 2, wherein the resource request message (RRM) transmitted from the transmitter station to request allocation of some of the OFDMA resources for the peer-to-peer communication session with the receiver station, comprises:

an indicator which indicates the type of peer-to-peer communication session the transmitter station would like to set up with the receiver station including information regarding QoS requirements for that type of peer-to-peer communication session;

information regarding the station type of the transmitter station; and information regarding the size of the packet to be transmitted by the transmitter station.

6. A method according to claim 2, wherein the step of measuring first metric with respect to some of the selected OFDMA resources specified in the PRAM, comprises:

decoding, at the recipient stations including the transmitter station, the PRAM;

starting a resource measurement period timer at each of the recipient stations including the transmitter station;

monitoring, at the recipient stations including the transmitter station, an OFDMA channel for an OFDMA frame;

selecting, at the recipient stations including the transmitter station, particular ones of the selected OFDMA resources from the PRAM; and measuring, at the recipient stations including the transmitter station, the first metric with respect to each of the particular ones of the selected OFDMA resources that are selected by that particular recipient station.

7. A method according to claim 6, wherein the step of generating, at each of the recipient stations including the transmitter station, a resource map response message (RMRM), comprises:

sorting, at each of the recipient stations including the transmitter station, measured first metric for each of the particular ones of the selected OFDMA resources into one of a plurality of first metric categories that categorize the particular ones of the selected OFDMA resources based on measured first metric, wherein the plurality of first metric categories comprise: a high first metric category that includes information regarding peer stations that cause high level interference; a medium first metric category that includes information regarding peer stations that cause medium level interference, and a low first metric category that includes information regarding peer stations that cause low level interference;

generating, at each of the recipient stations including the transmitter station, a partial resource measurement map (PRMM) comprising the plurality of first metric categories, wherein each of the first metric categories includes first metric measurement information regarding some of the particular ones of the selected OFDMA resources; and generating, at each of the recipient stations including the transmitter station upon expiration of the resource measurement period, a resource map response message (RMRM) comprising the PRMM as determined by that particular station, wherein the RMRMs generated by the transmitter station comprises the first RMRMs including first PRMMs.

8. A method according to claim 7, wherein each RMRM comprises:
a resource type field that specifies a type of resource that the particular station is reporting in the RMRM;
a total categories field that specifies a total number of different first metric categories being reported in the RMRM; and
a partial resource measurement map (PRMM) comprising:
a plurality of first metric categories each including information regarding first metric measurements made by the particular station for selected ones of the selected OFDMA resources specified in the PRAM,
wherein the plurality of first metric power categories specified in each PRMM comprise: a high first metric category used to report high power first metric measurements, a medium first metric category used to report medium power first metric measurements, and a low first metric category used to report low power first metric measurements.

9. A method according to claim 8, wherein each of the first metric categories comprise a plurality of fields used to report information regarding first metric measurements by the particular station for that first metric power category, the plurality of fields comprising:
a category identifier field that identifies the particular first metric category;
a number measured field that specifies a number of first metric measurements that are included for the particular first metric category, and
a category MAP data field that specifies particular resource locations in the resource allocation map for the particular first metric category, wherein each particular resource location is specified as at least one specific sub-channels and at least one time slot.

10. A method according to claim 9, wherein the step of processing, at the base station, the RMRMs to determine specific ones of the OFDMA resources to be allocated to the transmitter station for the peer-to-peer communication session with the receiver station, comprises:
receiving, at the base station, the first resource map response message (RMRM) from the transmitter station;
determining, at the base station based on the RMM, a packet size the transmitter station requests to transmit in the peer-to-peer communication session with the receiver station;
determining, at the base station based on the one or more first PRMMs from the first RMRM, updated peer station information for the transmitter station; and
scheduling a first OFDMA resource in a first OFDMA time slot for a first transmission by the transmitter station to the receiver station during the peer-to-peer communication session; and scheduling other OFDMA resources in other OFDMA time slots for other transmissions by high first metric peer stations of the receiver station having high power first metric such that the first transmission is received by the receiver station at a time when the high first metric peer stations of the receiver station are not transmitting so that the first transmission is isolated in the time domain from the other transmissions by the high first metric peer stations of the receiver station.

11. A method according to claim 10, wherein the step of determining, at the base station based on the one or more first PRMMs from the first RMRM, updated peer station information for the transmitter station, comprises:
extracting, at the base station from the one or more first PRMMs that was received from the transmitter station, information regarding first metric measurements made by the transmitter station for the selected ones of the selected OFDMA resources;
using the resource allocation map maintained at the base station to translate the selected ones of the selected OFDMA resources into corresponding peer station identification numbers;
determining, at the base station, first metric categories from the one or more first PRMMs for each of the peer station identification numbers, and assigning each particular peer station identification number to one of: a high power first metric transmitter peer list that specifies peer stations having high power first metric, a low power first metric transmitter peer list that specifies peer stations having low power first metric, and a medium power first metric transmitter peer list that specifies peer stations having medium power first metric;
creating, at the base station, an entry in a peer memory map (PMM) for the transmitter station, wherein the PMM comprises a plurality of rows, and a plurality of columns, the plurality of columns comprising:
a first column that lists peer station identification numbers corresponding to peer-to-peer enabled stations including the transmitter station and the receiver station, wherein each row corresponds to entry for a particular peer-to-peer enabled station that is identified in the first column by a particular peer station identification number;
a second column comprising the high power first metric transmitter peer list that specifies peer stations having high power first metric, wherein the second column lists peer station identification numbers for peer stations of the corresponding station in the first column;
a third column comprising the low power first metric transmitter peer list that specifies peer stations having low power first metric, wherein the third column lists peer station identification numbers for peer stations of the corresponding station in the first column; and
a fourth column comprising the medium power first metric transmitter peer list that specifies peer stations having medium power first metric, wherein the fourth column lists peer station identification numbers for peer stations of the corresponding station in the first column.

12. A method according to claim 11, wherein the step of scheduling comprises:
processing, at the base station, the first PRMM provided in the first RMRM and other PRMMs provided in other RMRMs from other recipient stations, to generate:
a high impact peer set that identifies stations in the high power first metric transmitter peer list of the transmitter station that are susceptible to near-far issues when one station that belongs to the high impact peer set transmits while another station that belongs to the high impact peer set is receiving a different transmission from another station that does not belong to the high impact peer set, and a low impact peer set that identifies stations in the low power first metric transmitter peer list of the transmitter station that are not susceptible to near-far issues when one station that belongs to the low impact peer set transmits while another station that belongs to the low impact peer set is receiving a different transmission from another station that does not belong to the low impact peer set;

using information in the resource allocation map, the high impact peer set and the low impact peer set to determine preferred OFDMA time slots ($TS_p$) of the OFDMA frame and excluded OFDMA time slots ($TS_x$) of the OFDMA frame, and marking the preferred OFDMA time slots ($TS_p$) and excluded OFDMA time slots ($TS_x$) in the resource allocation map maintained at the base station;

estimating, at the base station, a resource allocation size (RAS) for the peer-to-peer communication session between the transmitter station and the receiver station; and determining, at the base station based on the estimated RAS, a resource allocation comprising at least one of the preferred OFDMA time slot ($TS_p$) and at least one subchannel in that preferred OFDMA time slot ($TS_p$) to allocate for the peer-to-peer communication session between the transmitter station and the receiver station.

13. A method according to claim 12, wherein the step of using information in the resource allocation map, the high impact peer set and the low impact peer set to determine preferred OFDMA time slots ($TS_p$) of the OFDMA frame and excluded OFDMA time slots ($TS_x$) of the OFDMA frame, and marking the preferred OFDMA time slots ($TS_p$) and excluded OFDMA time slots ($TS_x$) in the resource allocation map maintained at the base station, comprises:

marking, at the base station, any time slots allocated to peer stations in a high impact peer set of the receiver station as excluded OFDMA time slots ($TS_x$) of the OFDMA frame;

marking, at the base station, any time slots allocated to peer stations in the high impact peer set of the transmitter station as preferred OFDMA time slots ($TS_p$) of the OFDMA frame; and when the high impact peer set of the transmitter station includes no peer stations, marking, at the base station, any time slots allocated to peer stations in a low impact peer set of the receiver station as preferred OFDMA time slots ($TS_p$) of the OFDMA frame.

14. A method according to claim 13, when an OFDMA time slot is marked as being both an excluded time slot ($TS_x$) and preferred time slot ($TS_p$), further comprising:

marking the OFDMA time slot: as a preferred OFDMA time slot ($TS_p$) of the OFDMA frame when the transmitter station is a member of the high impact peer set of the receiver station, or as an excluded OFDMA time slot ($TS_x$) of the OFDMA frame when the transmitter station is not a member of the high impact peer set of the receiver station.

15. A method according to claim 12, further comprising:

transmitting, from the base station to the transmitter station and the receiver station, a resource grant message (RGM) to notify the transmitter station and the receiver station of the resources allocation to the transmitter station and the receiver station for the peer-to-peer communication session between the transmitter station and the receiver station.

16. A method according to claim 2, wherein the first metric comprises a radio frequency (RF) quality metric.

17. A method according to claim 16, wherein the RF quality metric comprises: Receive Signal Strength (RSS) power levels.

18. A method according to claim 16, wherein the RF quality metric comprises: Signal-to-interference-plus-Noise Ratio (SINR).

19. A method according to claim 16, wherein the RF quality metric comprises: Signal-to-Noise Ratio (SNR).

20. A method according to claim 16, wherein the RF quality metric comprises: range.

21. A method according to claim 1, wherein the OFDMA frame comprises:

a downlink portion comprising downlink OFDMA resources for downlink communications from the base station to stations, and an uplink portion comprising uplink OFDMA resources for normal uplink communications from the stations to the base station and for direct peer-to-peer communication between stations and wherein the resource allocation map comprises:

designations of selected ones of the downlink OFDMA resources presently allocated to stations for downlink communications from the base station to stations, and designations of selected ones of the uplink OFDMA resources presently allocated to stations for normal uplink communications from the stations to the base station and presently allocated for direct peer-to-peer communication between stations in the uplink portion of the OFDMA frame.

22. A method according to claim 21, wherein the uplink portion comprises a dedicated zone, wherein the dedicated zone comprises OFDMA resources reserved exclusively for direct station-to-station communications such that normal uplink communications from the stations to the base station can not be scheduled in the dedicated zone.

23. A method according to claim 1, wherein the base station defines a cell of an OFDMA communication system, and wherein the OFDMA communication system comprises:

a wide area wireless OFDMA communication network.

* * * * *